US010587431B2

(12) United States Patent
Zhang et al.

(10) Patent No.: US 10,587,431 B2
(45) Date of Patent: Mar. 10, 2020

(54) TUNNEL ESTABLISHMENT METHOD AND APPARATUS

(71) Applicant: Huawei Technologies Co., Ltd., Shenzhen (CN)

(72) Inventors: Tao Zhang, Beijing (CN); Bo Lin, Beijing (CN); Hao Bi, Rolling Meadows, IL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 473 days.

(21) Appl. No.: 15/014,984

(22) Filed: Feb. 3, 2016

(65) Prior Publication Data
US 2016/0156485 A1 Jun. 2, 2016

Related U.S. Application Data

(63) Continuation of application No. PCT/CN2014/071511, filed on Jan. 26, 2014.

(30) Foreign Application Priority Data

Aug. 8, 2013 (WO) ................ PCT/CN2013/081101

(51) Int. Cl.
H04L 12/46 (2006.01)
H04L 12/707 (2013.01)
(Continued)

(52) U.S. Cl.
CPC .......... *H04L 12/4633* (2013.01); *H04L 45/22* (2013.01); *H04L 47/122* (2013.01);
(Continued)

(58) Field of Classification Search
None
See application file for complete search history.

(56) References Cited

U.S. PATENT DOCUMENTS

2004/0066769 A1  4/2004 Ahmavaara et al.
2011/0261800 A1  10/2011 You et al.
(Continued)

FOREIGN PATENT DOCUMENTS

CN    101128041 A    2/2008
CN    101136835 A    3/2008
(Continued)

OTHER PUBLICATIONS

"3$^{rd}$ Generation Partnership Project; Technical Specification Group Services and System Aspects; General Packet Radio Service (GPRS) enhancements for Evolved Universal Terrestrial Radio Access Network (U-UTRAN) access (Release 12)," 3GPP TS 23.401, V12.1.0, pp. 1-291, 3$^{rd}$ Generation Partnership Project, Valbonne, France (Jun. 2013).

(Continued)

*Primary Examiner* — Shirley X Zhang
(74) *Attorney, Agent, or Firm* — Leydig, Voit & Mayer, Ltd.

(57) ABSTRACT

The present invention relates to the field of communications technologies and discloses a tunnel establishment method and apparatus. Even if an entity for executing the solution is not changed, a type of a tunnel established for each service of a terminal may be the same or may be different. For example, a first tunnel and a second tunnel may be established for a current service of the terminal, and a third tunnel may be established for a next service of the terminal. This eases congestion in a backbone network between a secondary access network node and a primary access network node. Alternatively, this avoids using a directly connected tunnel as a tunnel established between the secondary access network node and a core network user plane node when a core network control plane node needs to receive and send too much path switching signaling.

12 Claims, 14 Drawing Sheets

(51) Int. Cl.
  *H04W 76/22* (2018.01)
  *H04W 76/12* (2018.01)
  *H04L 12/803* (2013.01)
  *H04W 76/15* (2018.01)

(52) U.S. Cl.
  CPC .......... *H04W 76/12* (2018.02); *H04L 47/125* (2013.01); *H04W 76/15* (2018.02); *H04W 76/22* (2018.02)

(56) References Cited

U.S. PATENT DOCUMENTS

| | | | |
|---|---|---|---|
| 2012/0236823 A1 | 9/2012 | Kompella et al. | |
| 2012/0287894 A1 | 11/2012 | Zhou et al. | |
| 2013/0114404 A1 | 5/2013 | Yang | |
| 2014/0219248 A1* | 8/2014 | Reddiboyana | H04W 76/025 370/331 |
| 2014/0301360 A1* | 10/2014 | Bontu | H04W 36/0083 370/331 |
| 2014/0355562 A1* | 12/2014 | Gao | H04W 76/025 370/331 |
| 2014/0376506 A1 | 12/2014 | Hu | |
| 2015/0351139 A1* | 12/2015 | Zhang | H04W 52/0251 370/329 |
| 2016/0112945 A1* | 4/2016 | Chen | H04W 28/085 370/338 |

FOREIGN PATENT DOCUMENTS

| | | |
|---|---|---|
| CN | 101409951 A | 4/2009 |
| CN | 101557609 A | 10/2009 |
| CN | 101753638 A | 6/2010 |
| CN | 101854285 A | 10/2010 |
| CN | 102301788 A | 12/2011 |
| CN | 102404221 A | 4/2012 |
| CN | 102638899 A | 8/2012 |
| CN | 102790979 A | 11/2012 |
| KR | 20050057628 A | 6/2005 |
| KR | 20100073842 A | 7/2010 |
| WO | WO 2009057045 A2 | 5/2009 |

OTHER PUBLICATIONS

"3$^{rd}$ Generation Partnership Project; Technical Specification Group Radio Access Network; Evolved Universal Terrestrial Radio Access Network (E-UTRAN); S1 Application Protocol (S1AP) (Release 11)," 3GPP TS 36.413, V11.4.0, pp. 1-274, 3$^{rd}$ Generation Partnership Project, Valbonne, France (Jun. 2013).

"3$^{rd}$ Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)," 3GPP TR 36.842, V0.2.0, pp. 1-38, 3$^{rd}$ Generation Partnership Project, Valbonne, France (May 2013).

"Preliminary discussion on inter-ENB Carrier Aggregation," 3GPP TSG-RAN WG2 Meeting #81, St. Julian's, Malta, R2-130099, 3$^{rd}$ Generation Partnership Project, Valbonne, France (Jan. 28-Feb. 1, 2013).

"Discussion on S1 split for dual connectivity," 3GPP TSG-RAN WG2 #81bis, Chicago, Illinois, Tdoc R2-131326, 3$^{rd}$ Generation Partnership Project, Valbonne, France (Apr. 15-19, 2013).

"Discussion on different backhaul alternatives for small cell enhancements," 3GPP TSG-RAN WG2 Meeting #82, Fukuoka, Japan, R2-131907, 3$^{rd}$ Generation Partnership Project, Valbonne, France (May 20-27, 2013).

"User plane architecture for Dual Connectivity," 3GPP TSG RAN WG2 Meeting #82, Fukuoka, Japan, R2-131982, 3$^{rd}$ Generation Partnership Project, Valbonne, France (May 20-25, 2013).

"3$^{rd}$ Generation Partnership Project; Technical Specification Group Radio Access Network; Evolved Universal Terrestrial Radio Access Network (E-UTRAN); X2 application protocol (X2AP) (Release 11)," 3GPP TS 36.423, V11.5.0, pp. 1-144, 3$^{rd}$ Generation Partnership Project, Valbonne, France (Jun. 2013).

* cited by examiner

TUNNEL ESTABLISHMENT METHOD AND APPARATUS

CROSS-REFERENCE TO RELATED APPLICATIONS

This application is a continuation of International Patent Application No. PCT/CN2014/071511, filed on Jan. 26, 2014, which claims priority to International Patent Application No. PCT/CN2013/081101, filed on Aug. 8, 2013, both of which are hereby incorporated by reference in their entireties.

TECHNICAL FIELD

The present invention relates to the field of communications technologies, and in particular, to a tunnel establishment method and apparatus.

BACKGROUND

With development of communications technologies, mobile communications networks and broadband radio access networks continuously evolve in their respective development directions, a wide variety of wireless networks emerge one after another, and different wireless networks have different features and service provisioning capabilities.

A next-generation wireless network is a heterogeneous network based on integration of multiple radio access technologies, including broadband wireless access, a cellular mobile communications system, a digital television broadcast network, and a satellite communications system. The heterogeneous network enables interconnection and interworking between different systems, so as to ensure that users can make full use of these heterogeneous radio access technologies, thereby satisfying various requirements of the users. For example, hybrid deployment of a secondary access network node (such as an SCN (small cell node)) and a primary access network node (such as an eNB (EUTRAN Node B, common base station)) forms a HetNet (heterogeneous network), where the secondary access network node has a small coverage area of cells, and the primary access network node has a large coverage area of cells. Compared with a HomoNet (homogeneous network) that includes only primary access network nodes, the HetNet features a greater throughput, a stronger capability of adapting to deployment scenarios, and the like, which can meet various requirements of the users.

In the HetNet, before a terminal interacts with a core network, not only physical connections need to be established between the secondary access network node and the primary access network node and between some core network nodes, but also tunnels that are used for transmitting user data need to be established on these physical connections. There are a variety of core network nodes: a core network control plane node, such as an MME (mobility management entity), and a core network user plane node, such as an SGW (serving gateway). The core network control plane node and the core network user plane node may be a same node, such as an SGSN (serving GPRS support node, GPRS (general packet radio service)). The terminal can interact with the core network nodes in the HetNet and the core network nodes in the HetNet can provide services for the terminal only after the tunnels are established.

In the prior art, there are mainly two manners of establishing a tunnel between a secondary access network node and a core network user plane node, as shown in FIG. 1A (the tunnel between the secondary access network node and the core network user plane node is transferred by a primary access network node) and FIG. 1B (the tunnel between the secondary access network node and the core network user plane node is not transferred by the primary access network node, but is a directly connected tunnel). A tunnel establishment manner in the primary access network node is fixed and switching between different tunnel establishment manners is not allowed. Therefore, only the tunnel establishment manner in either FIG. 1A or FIG. 1B can be selected, and switching between the two tunnel establishment manners is not allowed. However, if the primary access network node selects the tunnel establishment manner shown in FIG. 1A all the time, all user data between the secondary access network node and the core network user plane node passes through the primary access network node, which places higher pressures on a backbone network between the secondary access network node and the primary access network node, is likely to cause congestion, and further increases a delay in transmission of user data packets. Therefore, this increases a probability that the user data packets are discarded and deteriorates user experience. If the primary access network node selects the tunnel establishment manner shown in FIG. 1B all the time, when a terminal moves among different secondary access network nodes, a core network control plane node needs to receive and send path switching signaling, where the path switching instruction is used to process path switching caused by terminal moving; when there is too much path switching signaling that the core network control plane node needs to receive and send, a core network may break down and consequently an entire network cannot operate properly.

SUMMARY

Embodiments of the present invention provide a tunnel establishment method and apparatus, to resolve problems of a longer delay in transmission of user data packets, a higher user data packet loss probability, or a core network breakdown that exist in the prior art.

According to a first aspect, a tunnel establishment method is provided, including:

receiving a first tunnel establishment request sent by a core network control plane node, where the first tunnel establishment request is sent after the core network control plane node receives a second tunnel establishment request sent by a core network user plane node;

acquiring type information of a to-be-established tunnel; and establishing a tunnel between the core network user plane node and a secondary access network node according to the first tunnel establishment request and based on the type information of the to-be-established tunnel.

With reference to the first aspect, in a first possible implementation manner, the acquiring type information of a to-be-established tunnel includes:

receiving a tunnel type indication message that is sent by an operation, administration and maintenance OAM system, or the core network user plane node, or the core network control plane node; and obtaining the type information of the to-be-established tunnel by parsing the tunnel type indication message, where the type information of the to-be-established tunnel is separately determined by the OAM, or the core network user plane node, or the core network control plane node according to network load information.

With reference to the first aspect, in a second possible implementation manner, the acquiring type information of a to-be-established tunnel includes:

obtaining the type information of the to-be-established tunnel by parsing the first tunnel establishment request, where the tunnel type information acquired from the first tunnel establishment request is determined by the core network control plane node or the core network user plane node according to network load information.

With reference to the first or the second possible implementation manner of the first aspect, in a third possible implementation manner, if the type information of the to-be-established tunnel is acquired according to the tunnel type indication message, a capability indication message that carries supported tunnel type information is sent to the OAM system, or the core network user plane node, or the core network control plane node before the tunnel type indication message is received; or if the type information of the to-be-established tunnel is acquired according to the first tunnel establishment request, a capability indication message that carries supported tunnel type information is sent to the core network user plane node or the core network control plane node before the first tunnel establishment request is received.

With reference to the first aspect, in a fourth possible implementation manner, the acquiring type information of a to-be-established tunnel includes:

acquiring network load information; and determining the type information of the to-be-established tunnel according to the network load information.

With reference to the first to the fourth possible implementation manners of the first aspect, in a fifth possible implementation manner, the type information of the to-be-established tunnel is to allow termination of a tunnel from the core network user plane node for the secondary access network node, or is to forbid termination of a tunnel from the core network user plane node for the secondary access network node.

With reference to the first to the fifth possible implementation manners of the first aspect, in a sixth possible implementation manner, the network load information includes:

data load of an established tunnel between the secondary access network node and a primary access network node; and/or path switching signaling load of the core network control plane node.

With reference to the first aspect and the first to the sixth possible implementation manners of the first aspect, in a seventh possible implementation manner, the establishing a tunnel between the core network user plane node and a secondary access network node includes:

establishing a first tunnel between the core network user plane node and the primary access network node, and establishing a second tunnel between the secondary access network node and the primary access network node; or establishing a third tunnel between the core network user plane node and the secondary access network node.

With reference to the seventh possible implementation manner of the first aspect, in an eighth possible implementation manner, the establishing a first tunnel between the core network user plane node and the primary access network node includes:

acquiring, from the received first tunnel establishment request, first tunnel information corresponding to a tunnel endpoint allocated by the core network user plane node; and sending, to the core network user plane node, second tunnel information corresponding to a tunnel endpoint allocated by the primary access network node.

With reference to the seventh possible implementation manner of the first aspect, in a ninth possible implementation manner, the establishing a second tunnel between the secondary access network node and the primary access network node includes:

sending, to the secondary access network node, third tunnel information corresponding to a tunnel endpoint allocated by the primary access network node; and receiving fourth tunnel information corresponding to a tunnel endpoint allocated by the secondary access network node.

With reference to the seventh possible implementation manner of the first aspect, in a tenth possible implementation manner, the establishing a third tunnel between the core network user plane node and the secondary access network node includes:

acquiring, from the received first tunnel establishment request, first tunnel information corresponding to a tunnel endpoint allocated by the core network user plane node, and sending the first tunnel information to the secondary access network node; and receiving fourth tunnel information corresponding to a tunnel endpoint allocated by the secondary access network node, and sending the fourth tunnel information to the core network user plane node.

According to a second aspect, a tunnel establishment apparatus is provided, including:

a tunnel establishment request receiving module, configured to receive a first tunnel establishment request sent by a core network control plane node, where the first tunnel establishment request is sent after the core network control plane node receives a second tunnel establishment request sent by a core network user plane node;

a tunnel type acquiring module, configured to acquire type information of a to-be-established tunnel; and a tunnel establishment module, configured to establish a tunnel between the core network user plane node and a secondary access network node according to the first tunnel establishment request and based on the type information of the to-be-established tunnel.

With reference to the second aspect, in a first possible implementation manner, the tunnel type acquiring module is specifically configured to:

receive a tunnel type indication message that is sent by an operation, administration and maintenance OAM system, or the core network user plane node, or the core network control plane node; and obtain the type information of the to-be-established tunnel by parsing the tunnel type indication message, where the type information of the to-be-established tunnel is separately determined by the OAM, or the core network user plane node, or the core network control plane node according to network load information.

With reference to the second aspect, in a second possible implementation manner, the tunnel type acquiring module is specifically configured to:

obtain the type information of the to-be-established tunnel by parsing the first tunnel establishment request, where the tunnel type information acquired from the first tunnel establishment request is determined by the core network control plane node or the core network user plane node according to network load information.

With reference to the first or the second possible implementation manner of the second aspect, in a third possible implementation manner, the tunnel type acquiring module is specifically configured to:

if the type information of the to-be-established tunnel is acquired according to the tunnel type indication message, a capability indication message that carries supported tunnel type information is sent to the OAM system, or the core network user plane node, or the core network control plane node before the tunnel type indication message is received; or if the type information of the to-be-established tunnel is acquired according to the first tunnel establishment request, a capability indication message that carries supported tunnel type information is sent to the core network user plane node or the core network control plane node before the first tunnel establishment request is received.

With reference to the second aspect, in a fourth possible implementation manner, the tunnel type acquiring module is specifically configured to:

acquire network load information, and determine the type information of the to-be-established tunnel according to the network load information.

With reference to the first to the fourth possible implementation manners of the second aspect, in a fifth possible implementation manner, the type information of the to-be-established tunnel that is acquired by the tunnel type acquiring module is to allow termination of a tunnel from the core network user plane node for the secondary access network node, or is to forbid termination of a tunnel from the core network user plane node for the secondary access network node.

With reference to the first to the fifth possible implementation manners of the second aspect, in a sixth possible implementation manner, the network load information used for determining the type information of the to-be-established tunnel that is acquired by the tunnel type acquiring module includes:

data load of an established tunnel between the secondary access network node and a primary access network node; and/or path switching signaling load of the core network control plane node.

With reference to the second aspect and the first to the sixth possible implementation manners of the second aspect, in a seventh possible implementation manner, the tunnel establishment module is specifically configured to:

establish a first tunnel between the core network user plane node and the primary access network node, and establish a second tunnel between the secondary access network node and the primary access network node; or establish a third tunnel between the core network user plane node and the secondary access network node.

With reference to the seventh possible implementation manner of the second aspect, in an eighth possible implementation manner, the tunnel establishment module is specifically configured to:

acquire, from the received first tunnel establishment request, first tunnel information corresponding to a tunnel endpoint allocated by the core network user plane node; and send, to the core network user plane node, second tunnel information corresponding to a tunnel endpoint allocated by the primary access network node.

With reference to the seventh possible implementation manner of the second aspect, in a ninth possible implementation manner, the tunnel establishment module is specifically configured to:

send, to the secondary access network node, third tunnel information corresponding to a tunnel endpoint allocated by the primary access network node; and receive fourth tunnel information corresponding to a tunnel endpoint allocated by the secondary access network node.

With reference to the seventh possible implementation manner of the second aspect, in a tenth possible implementation manner, the tunnel establishment module is specifically configured to:

acquire, from the received first tunnel establishment request, first tunnel information corresponding to a tunnel endpoint allocated by the core network user plane node, and send the first tunnel information to the secondary access network node; and receive fourth tunnel information corresponding to a tunnel endpoint allocated by the secondary access network node, and send the fourth tunnel information to the core network user plane node.

In the embodiments of the present invention, a primary access network node can support at least two tunnel establishment manners, and therefore a tunnel between a core network user plane node and a secondary access network node can be established according to acquired type information of a to-be-established tunnel, in other words, switching may be performed between different tunnel establishment manners. This avoids continuing to use the primary access network node to transfer the tunnel between the secondary access network node and the core network user plane node when a backbone network between the secondary access network node and the primary access network node is congested, thereby easing the congestion in the backbone network between the secondary access network node and the primary access network node, reducing a delay in transmission of user data packets, and reducing losses of user data packets. Alternatively, this avoids using a directly connected tunnel as the tunnel between the secondary access network node and the core network user plane node when a core network control plane node needs to receive and send too much path switching signaling, thereby preventing a core network breakdown because the core network control plane node needs to receive and send too much path switching signaling.

DESCRIPTION OF EMBODIMENTS

To resolve problems of a longer delay in transmission of user data packets, a higher user data packet loss probability, or a core network breakdown that exist in the prior art, in embodiments of the present invention, a tunnel between a core network user plane node and a secondary access network node is established according to acquired type information of a to-be-established tunnel, and switching is performed between different tunnel establishment manners. This avoids continuing to use a primary access network node to transfer the tunnel between the secondary access network node and the core network user plane node when a backbone network between the secondary access network node and the primary access network node is congested, thereby easing the congestion in the backbone network between the secondary access network node and the primary access network node, reducing a delay in transmission of user data packets, and reducing losses of user data packets. Alternatively, this avoids using a directly connected tunnel as the tunnel between the secondary access network node and the core network user plane node when a core network control plane node needs to receive and send too much path switching signaling, thereby preventing a core network breakdown because the core network control plane node needs to receive and send too much path switching signaling.

The following describes implementation manners of the present invention in detail with reference to the accompanying drawings.

Figure 1A:
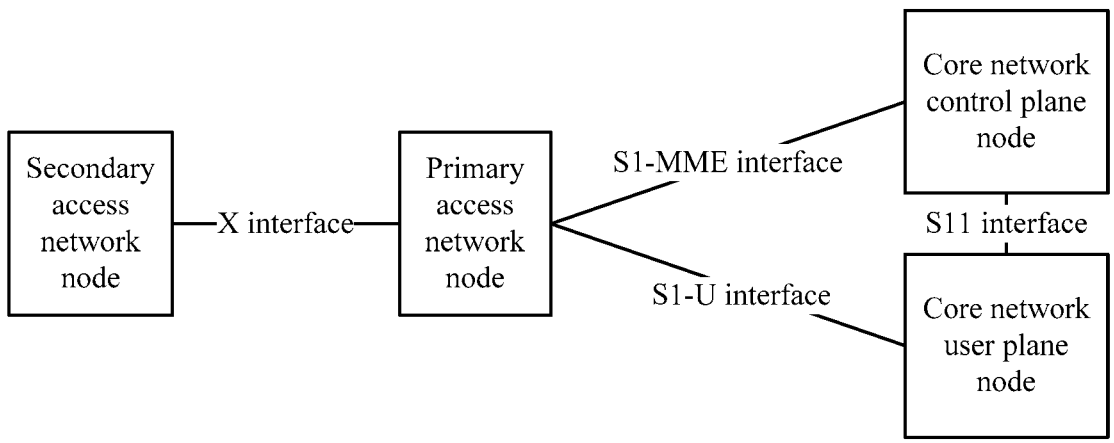
FIG. 1A shows a first manner of establishing a tunnel between a secondary access network node and a core network user plane node in the prior art.
Figure 1B:
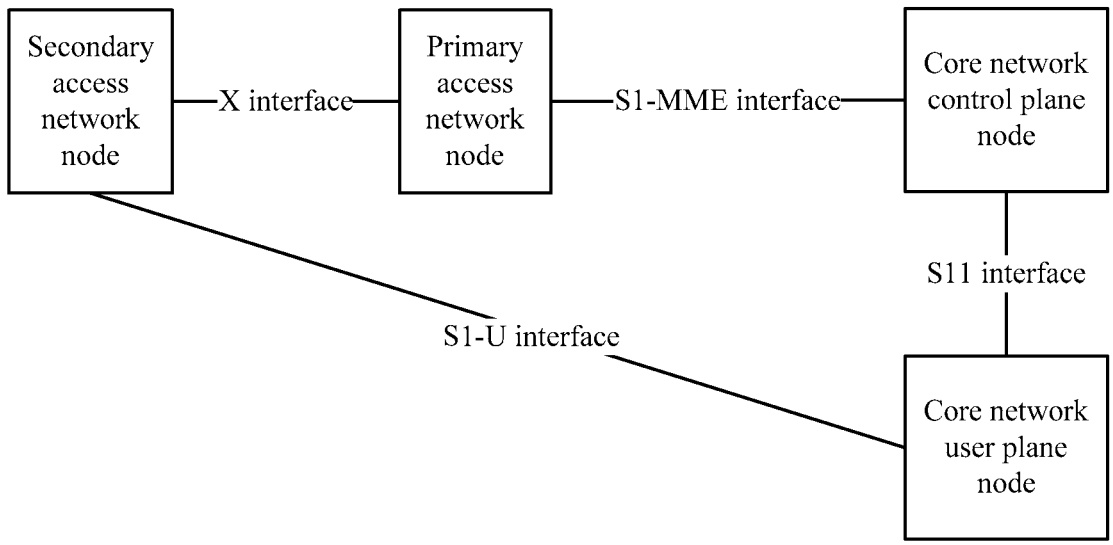
FIG. 1B shows a second manner of establishing a tunnel between a secondary access network node and a core network user plane node in the prior art.
Figure 2:
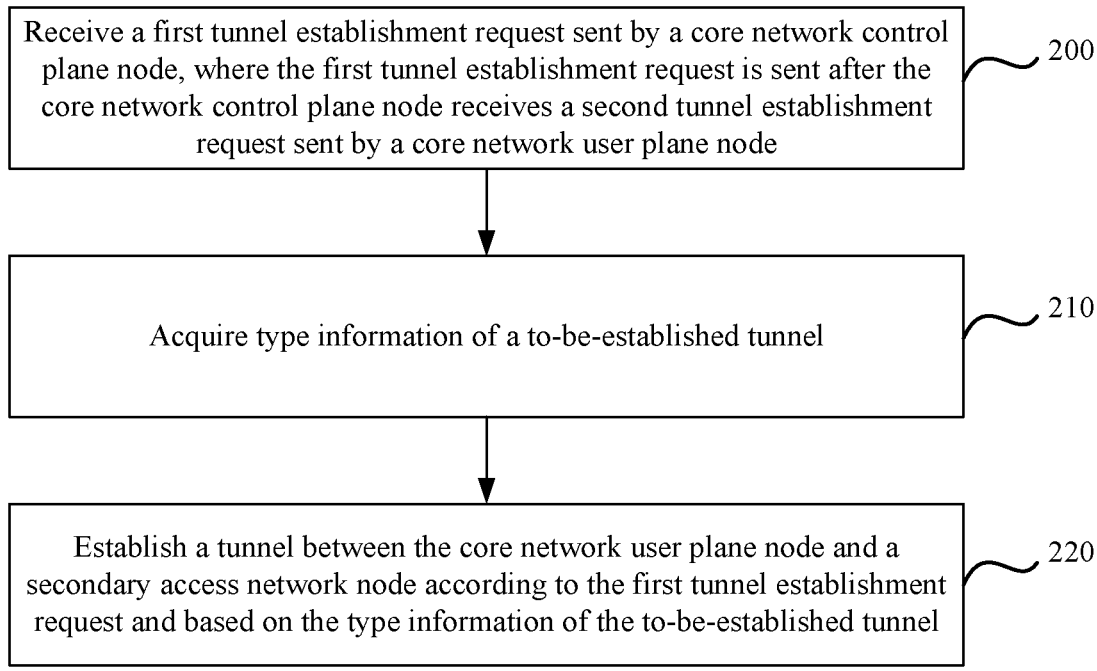
FIG. 2 is a detailed flowchart of tunnel establishment according to an embodiment of the present invention.

Referring to FIG. 2, in an embodiment of the present invention, a detailed tunnel establishment process is as follows:

Embodiment 1

Step 200: Receive a first tunnel establishment request sent by a core network control plane node, where the first tunnel establishment request is sent after the core network control plane node receives a second tunnel establishment request sent by a core network user plane node.

Step 210: Acquire type information of a to-be-established tunnel.

Step 220: Establish a tunnel between the core network user plane node and a secondary access network node according to the first tunnel establishment request and based on the type information of the to-be-established tunnel.

In this embodiment of the present invention, content carried in the first tunnel establishment request may be the same as or different from content carried in the second tunnel establishment request.

In step 200 in this embodiment of the present invention, there are multiple conditions for triggering the core network control plane node to send the first tunnel establishment request. For example, it may be that the core network user plane node sends the second tunnel establishment request to the core network control plane node when the core network user plane node determines that a terminal needs to perform service interaction with a core network, and then the core network control plane node sends the first tunnel establishment request after receiving the second tunnel establishment request. There are other manners, which are not further described in detail herein.

In this embodiment of the present invention, there are multiple manners of acquiring the type information of the to-be-established tunnel:

For example, a tunnel type indication message is first received, and then the type information of the to-be-established tunnel is obtained by parsing the tunnel type indication message, where the tunnel type indication message may be sent by an OAM (operation, administration and maintenance) system, or may be sent by the core network user plane node, or may further be sent by the core network control plane node.

When sending the tunnel type indication message, the OAM, or the core network user plane node, or the core network control plane node may determine the type information of the to-be-established tunnel according to network load information, add the determined type information of the to-be-established tunnel to the tunnel type indication message, and send the tunnel type indication message.

In this manner of obtaining the type information of the to-be-established tunnel by parsing the tunnel type indication message, the tunnel type indication message may be received before the first tunnel establishment request sent by the core network control plane node is received, or may be received after the first tunnel establishment request sent by the core network control plane node is received.

For another example, the type information of the to-be-established tunnel is obtained by parsing the first tunnel establishment request sent by the core network control plane node, where the tunnel type information is determined by the core network user plane node or the core network control plane node according to network load information.

In this manner, the core network control plane node sends the first tunnel establishment request only after the core network user plane node sends the second tunnel establishment request to the core network control plane node. Therefore, it may be that the type information of the to-be-established tunnel is added to the second tunnel establishment request when the core network user plane node sends the second tunnel establishment request to the core network control plane node, and the core network control plane node adds the type information of the to-be-established tunnel to the first tunnel establishment request after receiving the second tunnel establishment request; alternatively, it may be that the second tunnel establishment request does not include the type information of the to-be-established tunnel, and the core network control plane node adds the type information of the to-be-established tunnel to the first tunnel establishment request when sending the first tunnel establishment request.

For still another example, network load information is acquired, and the type information of the to-be-established tunnel is determined according to the network load information.

In the several manners described above, regardless of which node determines the network load information, the network load information may include one of or any combination of data load of an established tunnel between the secondary access network node and a primary access network node and path switching signaling load of the core network control plane node.

In the foregoing process, a determining entity determines tunnel type information according to network load information only when a tunnel is not established for the first time. When a tunnel is established for the first time, no network load information is generated, and the determining entity may determine tunnel type information according to an operator's pre-configuration.

In this embodiment of the present invention, an entity that executes steps 200 to 220 further needs to send a capability indication message that carries supported tunnel type information to the entity for determining the type information of the to-be-established tunnel, so that the entity for determining the type information of the to-be-established tunnel can determine the type information of the to-be-established tunnel according to the supported tunnel type information and the operator's pre-configuration.

For example, if the type information of the to-be-established tunnel is acquired from the tunnel type indication message, the capability indication message that carries the supported tunnel type information is sent to the OAM system, or the core network user plane node, or the core network control plane node before the tunnel type indication message is received.

If the type information of the to-be-established tunnel is acquired according to the first tunnel establishment request, the capability indication message that carries the supported tunnel type information is sent to the core network user plane node or the core network control plane node before the first tunnel establishment request is received.

An example in which the tunnel type indication message may be sent by the OAM and the entity that executes steps 200 to 220 is the primary access network node is used for description. After being powered on, the primary access network node sends the capability indication message that carries the supported tunnel type information to the OAM, and then the OAM sends, to the primary access network node, the tunnel type information determined according to the operator's pre-configuration, so that in a subsequent process, the OAM may determine the type information of the to-be-established tunnel according to the network load information, and further add the type information of the to-be-established tunnel, determined according to the network load information, to the tunnel type indication message for sending.

When network load is acquired, the network load may be acquired by means of active detection, or may be received from another node. For example, acquiring the data load of the established tunnel between the secondary access network node and the primary access network node may be: when the data load (for example, user data traffic) reaches a first preset threshold, actively reporting the data load by the secondary access network node or the primary access network node, or may be: periodically checking the data load of the established tunnel between the secondary access network node and the primary access network node and acquiring the data load.

For example, acquiring the path switching signaling load of the core network control plane node may be: after the path switching signaling load of the core network control plane node reaches a first preset threshold, actively reporting the path switching signaling load by the core network control plane node, or may be: periodically checking the path switching signaling load of the core network control plane node and acquiring the path switching signaling load.

For example, acquiring the network load by the OAM may be: when the secondary access network node determines that the data load of the established tunnel between the secondary access network node and the primary access network node exceeds the first preset threshold, reporting, by the secondary access network node, the network load to the OAM.

In this embodiment of the present invention, there may be a variety of type information of the to-be-established tunnel, which, for example, may be to allow termination of a tunnel from the core network user plane node for the secondary access network node, or may be to forbid termination of a tunnel from the core network user plane node for the secondary access network node.

In this embodiment of the present invention, there are multiple manners of establishing a tunnel between the core network user plane node and the secondary access network node. For example, a first tunnel is established between the core network user plane node and the primary access network node, and a second tunnel is established between the secondary access network node and the primary access network node; for example, a third tunnel is established between the core network user plane node and the secondary access network node.

In this embodiment of the present invention, there are multiple manners of establishing the first tunnel between the core network user plane node and the primary access network node. Optionally, first tunnel information corresponding to a tunnel endpoint allocated by the core network user plane node is acquired from the received first tunnel establishment request; and second tunnel information corresponding to a tunnel endpoint allocated by the primary access network node is sent to the core network user plane node. If the entity that executes steps 200 to 220 is the primary access network node, the foregoing operations are performed. If the entity that executes steps 200 to 220 is not the primary access network node, after the first tunnel information corresponding to the tunnel endpoint allocated by the core network user plane node is acquired from the received first tunnel establishment request, the first tunnel information further needs to be sent to the primary access network node.

Similarly, in this embodiment of the present invention, there are multiple manners of establishing the second tunnel between the secondary access network node and the primary access network node. Optionally, third tunnel information corresponding to a tunnel endpoint allocated by the primary access network node is sent to the secondary access network node; and fourth tunnel information corresponding to a tunnel endpoint allocated by the secondary access network node is received. If the entity that executes steps 200 to 220 is the primary access network node, the foregoing operations are performed. If the entity that executes steps 200 to 220 is not the primary access network node, after the fourth tunnel information corresponding to the tunnel endpoint allocated by the secondary access network node is received, the fourth tunnel information further needs to be sent to the primary access network node.

Similar to the foregoing manners of establishing the first tunnel or the second tunnel, in this embodiment of the present invention, there are multiple manners of establishing the third tunnel between the core network user plane node and the secondary access network node. Optionally, first tunnel information corresponding to a tunnel endpoint allocated by the core network user plane node is acquired from the received first tunnel establishment request, and the first tunnel information is sent to the secondary access network node; and fourth tunnel information corresponding to a tunnel endpoint allocated by the secondary access network node is received, and the fourth tunnel information is sent to the core network user plane node.

In this embodiment of the present invention, each piece of tunnel information includes at least IP (Internet Protocol) address information and a TEID (tunnel endpoint identifier).

For a better understanding of this embodiment of the present invention, the following provides a specific application scenario and further provides a detailed description with respect to a tunnel establishment process, using an example in which an execution entity is an eNB (the primary access network node is the eNB, the secondary access network node is an SCN, the core network user plane node is an SGW, and the core network control plane node is an MME).

Embodiment 2

Figure 3A:
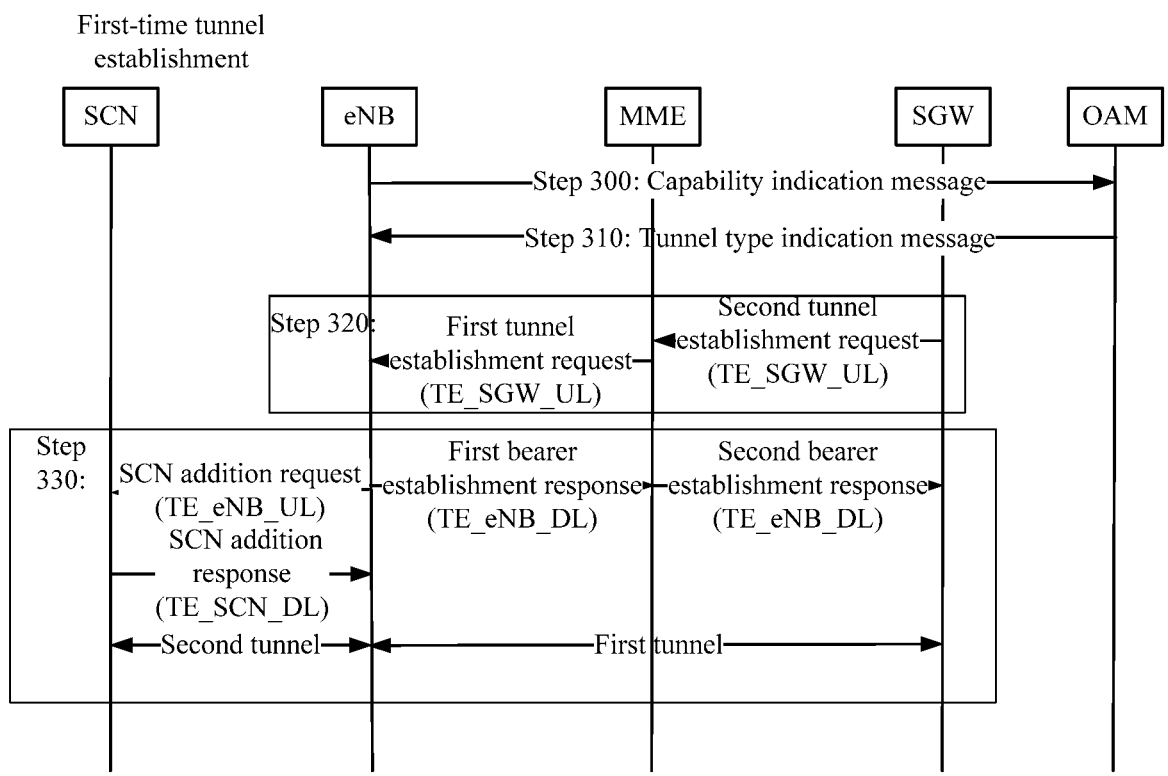
FIG. 3A is a first flowchart of tunnel establishment according to an embodiment of the present invention.
Figure 2A:
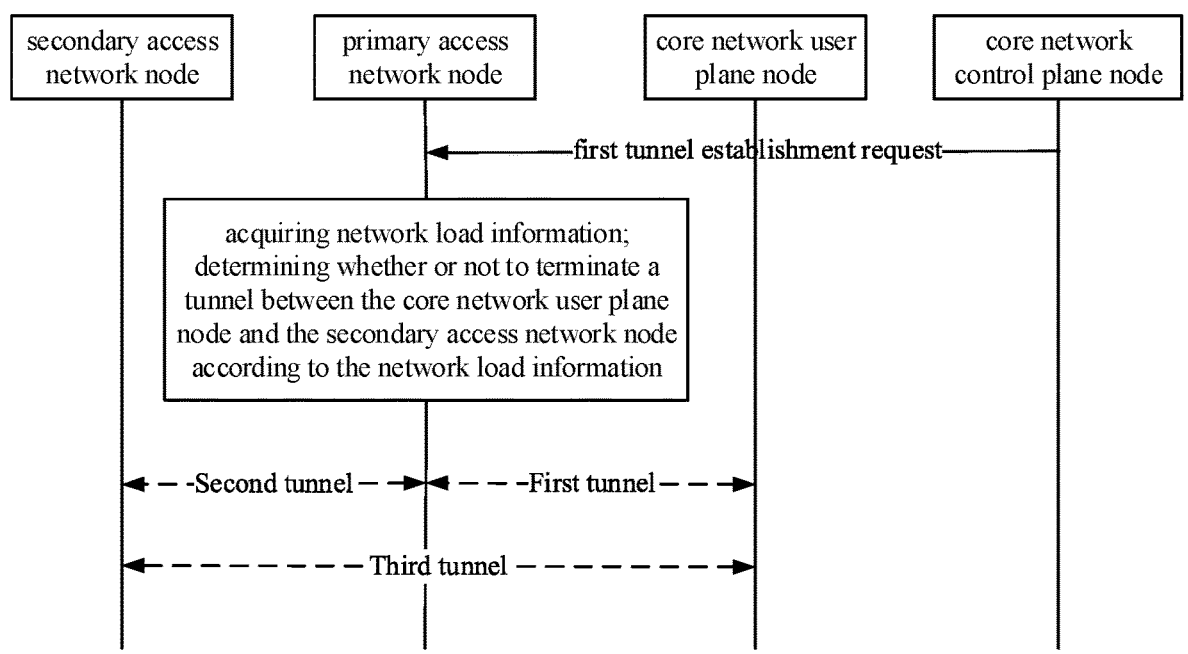
FIG. 2A is a detailed flowchart of tunnel establishment according to an embodiment of the present invention.

(Details are shown in FIG. 3A, in which an OAM sends a tunnel type indication message to an eNB and a tunnel is established for the first time.)

Step 300: After being powered on, the eNB reports a capability indication message that carries tunnel type information supported by the eNB to the OAM.

In this step, the capability indication message that carries the supported tunnel type information indicates that the eNB may establish a first tunnel and a second tunnel, and/or may establish a third tunnel.

Step 310: The OAM sends the tunnel type indication message to the eNB according to an operator's pre-configuration.

In this step, the tunnel type indication message carries type information of a to-be-established tunnel and indicates that the OAM allows the eNB to terminate a tunnel from an SGW for an SCN, that is, to establish the first tunnel and the second tunnel.

Step 320: After determining that a core network and a terminal need to perform data interaction, an SGW sends a second tunnel establishment request to an MME. After receiving the second tunnel establishment request, the MME sends a first tunnel establishment request to the eNB.

In this step, the second tunnel establishment request sent by the SGW carries first tunnel information (namely, TE_SGW_UL) corresponding to a tunnel endpoint that is allocated by the SGW and used to receive uplink data, and TE_SGW_UL includes IP address information of the tunnel endpoint and identifier information of the tunnel endpoint.

Step 330: The eNB establishes a first tunnel between the eNB and the SGW and establishes a second tunnel between the eNB and an SCN according to the received tunnel type indication message sent by the OAM.

Figure 3B:
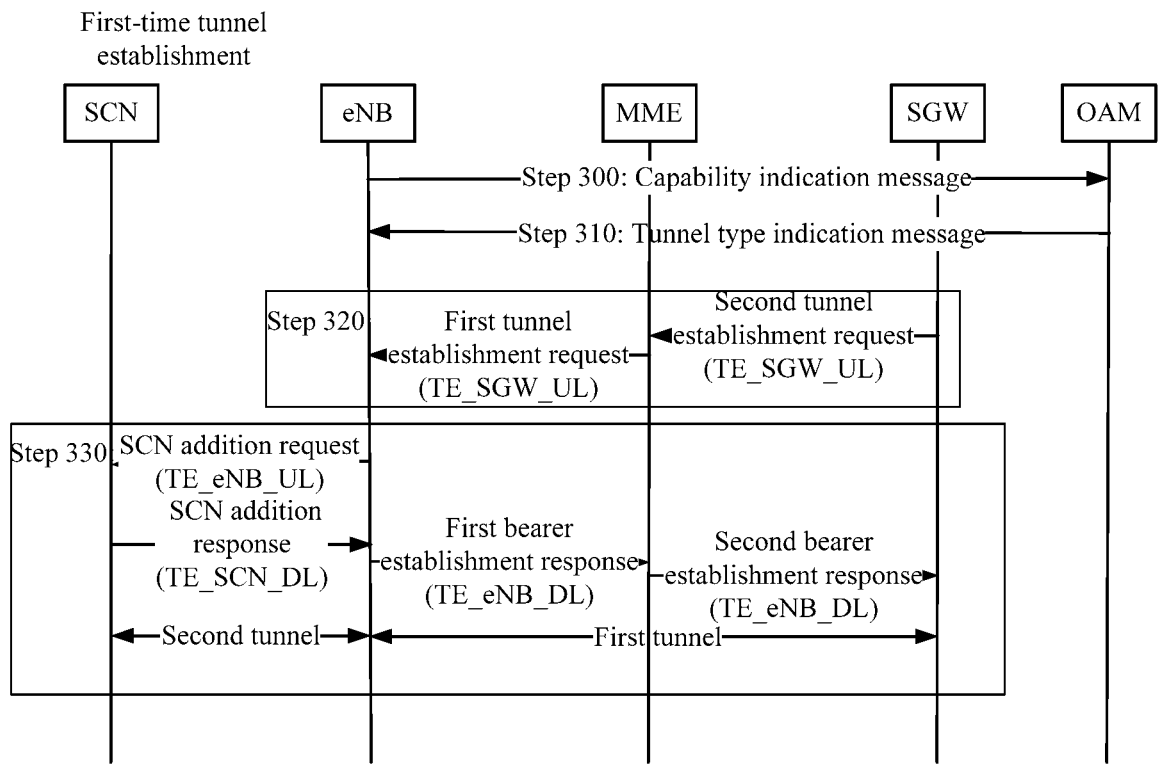
FIG. 3B is a second flowchart of tunnel establishment according to an embodiment of the present invention.

In this step, it may alternatively be that the second tunnel is established and then the first tunnel is established. Details are shown in FIG. 3B and are not described herein again.

Figure 3C:
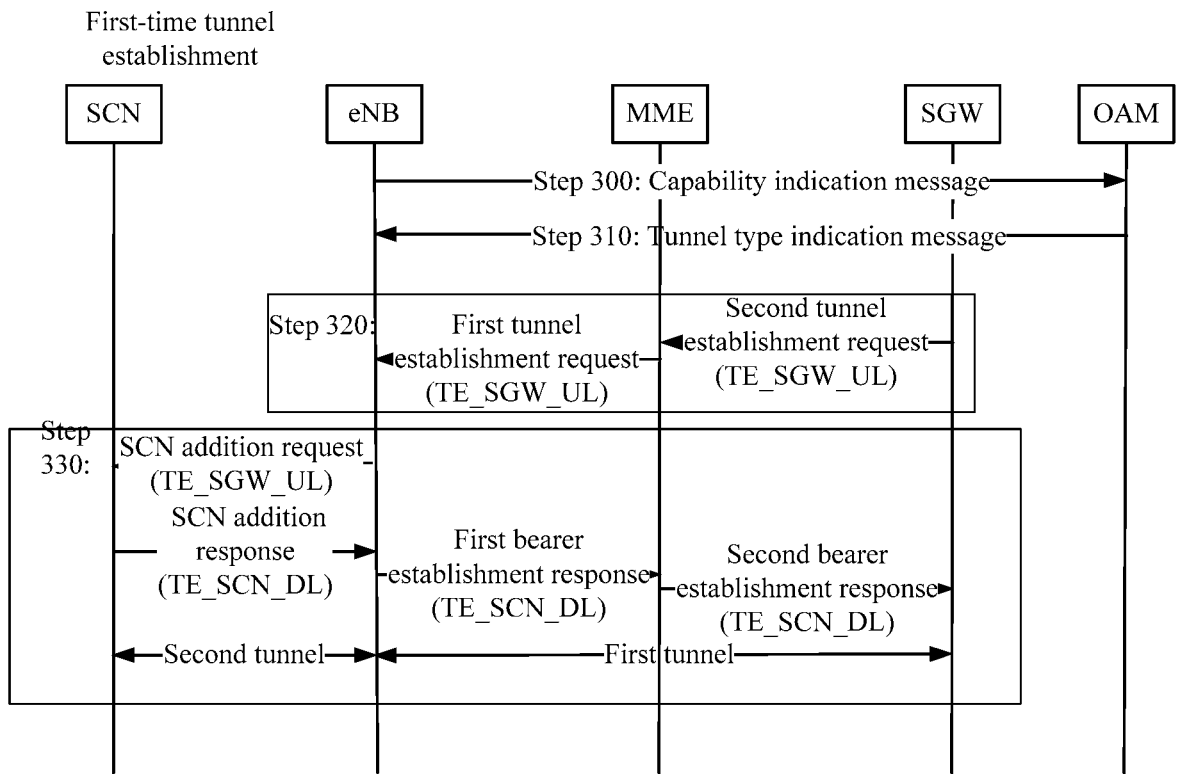
FIG. 3C is a third flowchart of tunnel establishment according to an embodiment of the present invention.

In an actual application, when a tunnel is established for the first time, the tunnel type indication message sent by the OAM to the eNB may carry information about establishing the first tunnel and the second tunnel, or may carry information about establishing the third tunnel. In this case, step 330 is changed to: The eNB establishes the third tunnel between the SGW and an SCN. For details, refer to FIG. 3C.

In Embodiment 2, after a tunnel is established for the first time, as long as the OAM no longer sends a tunnel type indication message to the eNB, the eNB performs step 330 after receiving a tunnel establishment request message.

A tunnel is established each time for each service of each terminal, and therefore, the established tunnel is released after each service is completed. After Embodiment 2, if the OAM needs to indicate to the eNB that a type of an established tunnel is changed in an actual application, the OAM needs to send a tunnel type indication message to the eNB. Embodiment 3 is used for description in the following.

Figure 3D:
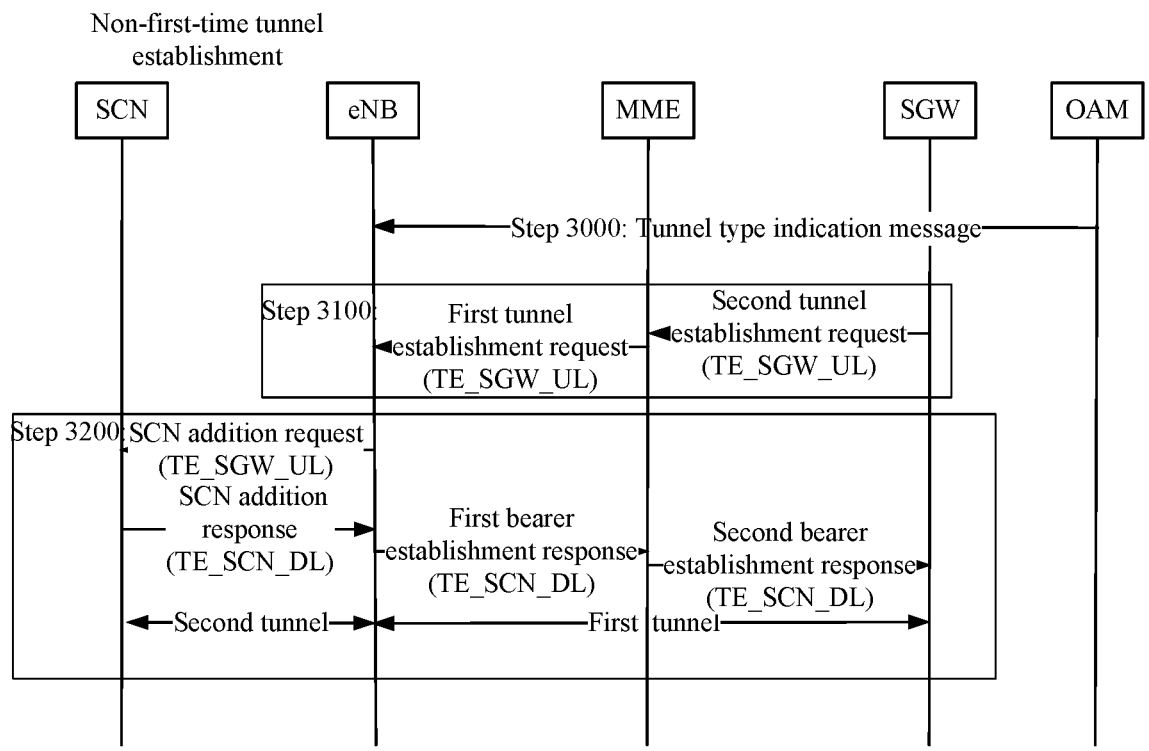
FIG. 3D is a fourth flowchart of tunnel establishment according to an embodiment of the present invention.

Embodiment 3 (Details are Shown in FIG. 3D, in which an OAM Sends a Tunnel Type Indication Message to an eNB and a Tunnel is not Established for the First Time)

Step 3000: The OAM sends to the eNB a tunnel type indication message for establishment of a third tunnel.

In this step, after data load of an established tunnel between an SCN and the eNB exceeds a first preset threshold, it may be that the SCN actively reports such a condition to the OAM, or it may be that the eNB reports such a condition to the OAM. After receiving the condition, the OAM sends a tunnel type indication message.

Step 3100: When determining that a core network and a terminal need to perform data interaction, an SGW sends a second tunnel establishment request to an MME. After receiving the second tunnel establishment request, the MME sends a first tunnel establishment request to the eNB.

Step 3200: The eNB establishes the third tunnel between the SCN and the SGW according to the received tunnel type indication message sent by the OAM.

Figure 3E:
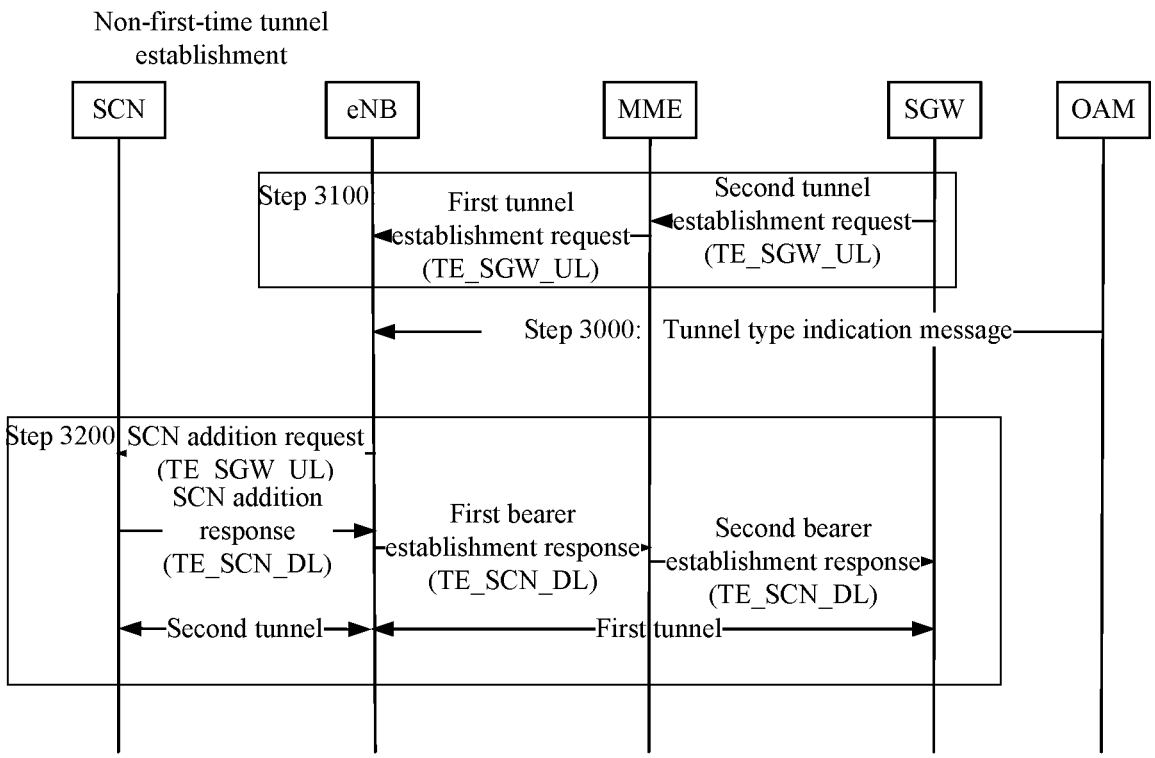
FIG. 3E is a fifth flowchart of tunnel establishment according to an embodiment of the present invention.

In this embodiment, the eNB first receives the tunnel type indication message sent by the OAM and then receives the first tunnel establishment request sent by the MME to the eNB, or it may be that the eNB first receives the first tunnel establishment request sent by the MME to the eNB and then receives the tunnel type indication message sent by the OAM. Details are shown in FIG. 3E. That is, in Embodiment 3, it may be that step 3000 and step 3100 are performed prior to step 3200, or it may be that step 3200 is performed prior to step 3000 and step 3100.

An example in which the OAM sends the tunnel type indication message to the eNB is used in Embodiment 2 and Embodiment 3. In an actual application, it may be that a core network user plane node, such as the SGW, sends the tunnel type indication message to the eNB, or it may be that a core network control plane node, such as the MME, sends the tunnel type indication message to the eNB. Details are not described herein again.

In the foregoing embodiments, the tunnel type indication message carries type information of a to-be-established tunnel and is sent to the eNB when the eNB is notified of a type of the to-be-established tunnel. Alternatively, in an actual application, the type information of the to-be-established tunnel may be carried in the first tunnel established request. The eNB acquires the type information of the to-be-established tunnel from the first tunnel establishment request, and then determines whether to establish the first tunnel and the second tunnel or to directly establish the third tunnel.

The following description uses an example in which the MME adds the type information of the to-be-established tunnel to a first tunnel type indication message for notifying the eNB.

Figure 4A:
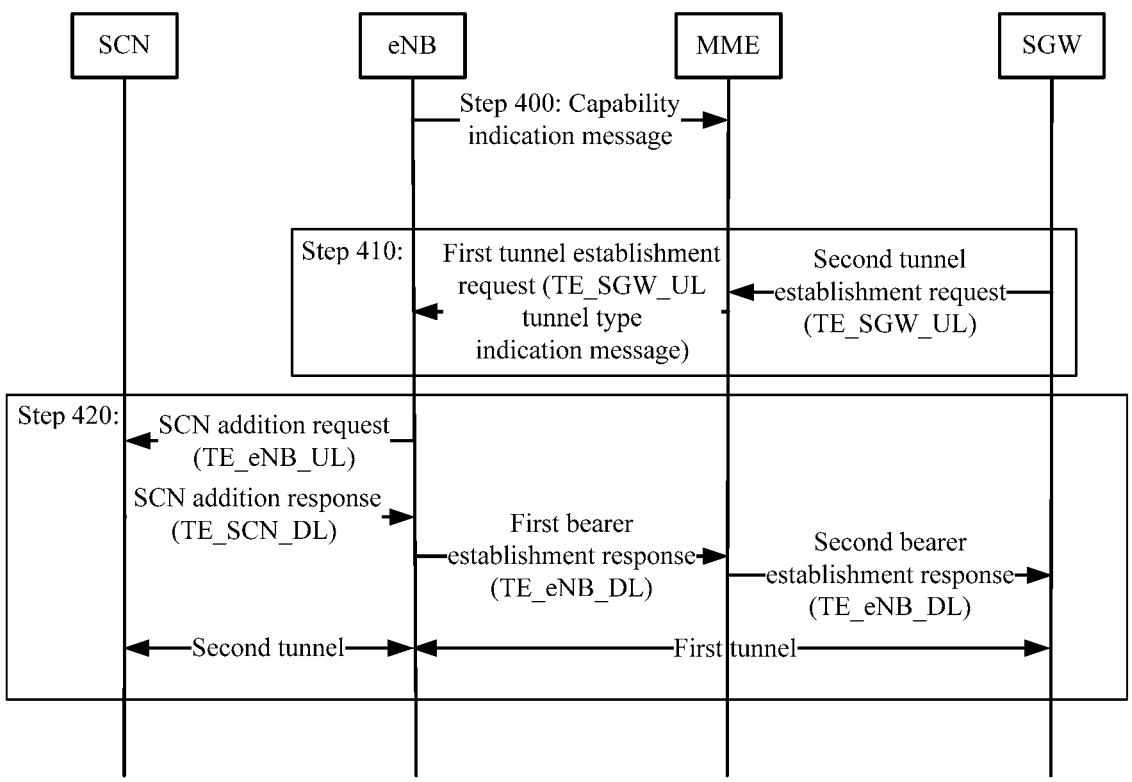
FIG. 4A is a sixth flowchart of tunnel establishment according to an embodiment of the present invention.

Embodiment 4 (Details are Shown in FIG. 4A in which a Tunnel is Established for the First Time)

Step 400: After being powered on, an eNB reports a capability indication message that carries tunnel type information supported by the eNB to an MME.

In this step, the capability indication message that carries the tunnel type information supported by the eNB indicates that the eNB has a capability of terminating a tunnel from an SGW for an SCN, that is, establishing a first tunnel and a second tunnel.

Step 410: When determining that a core network and a terminal need to perform data interaction, an SGW sends a second tunnel establishment request to the MME. After receiving the second tunnel establishment request, the MME sends a first tunnel establishment request to the eNB.

In this step, the first tunnel establishment request not only carries type information of a tunnel to be established by the eNB, but also carries first tunnel information corresponding to a tunnel endpoint that is allocated by the SGW and used to receive uplink data.

Step 420: The eNB establishes a first tunnel and a second tunnel based on the received first tunnel establishment request.

In Embodiment 4, after a tunnel is established for the first time, as long as the MME no longer sends a tunnel type indication message that carries a tunnel type information change to the eNB or no longer sends a tunnel type indication message to the eNB, the eNB performs step 420 after receiving the first tunnel establishment request message.

A tunnel is established each time for each service of each terminal, and therefore, the established tunnel is released after each service is completed. After Embodiment 4, when a tunnel is established again in an actual application, the MME may possibly instruct the eNB to establish a third tunnel instead of the first tunnel and the second tunnel. Embodiment 5 is used for description in the following.

Figure 4B:
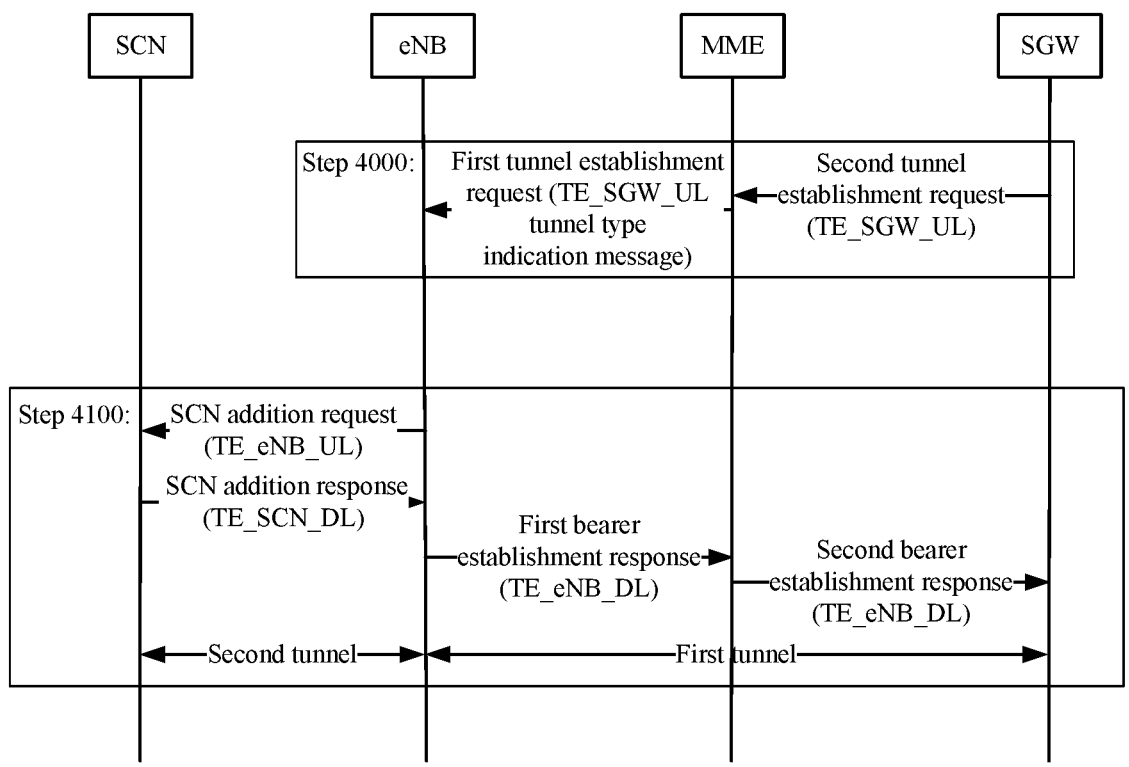
FIG. 4B is a seventh flowchart of tunnel establishment according to an embodiment of the present invention.

Embodiment 5 (Details are Shown in FIG. 4B in which a Tunnel is not Established for the First Time)

Step 4000: When determining that a core network and a terminal need to perform data interaction, an SGW sends a second tunnel establishment request to an MME. After receiving the second tunnel establishment request, the MME sends a first tunnel establishment request to an eNB.

In this step, the MME needs to determine that type information of a to-be-established tunnel that is carried in the first tunnel establishment request is information about a third tunnel, where the MME receives a message reported by an SCN and determines that data load of an established tunnel between the SCN and the eNB exceeds a first preset threshold. In an actual application, after the data load of the established tunnel between the SCN and the eNB exceeds the first preset threshold, it may be that the SCN actively reports such a condition to the MME, or it may be that the eNB reports such a condition to the MME.

In this step, the MME adds type information for establishing a third tunnel to the first tunnel establishment request. Meanwhile, the first tunnel establishment request further carries first tunnel information that is allocated by the SGW and used for receiving uplink data.

Step 4100: The eNB establishes a third tunnel between an SCN and the SGW according to the received first tunnel establishment request sent by the MME.

Figure 4C:
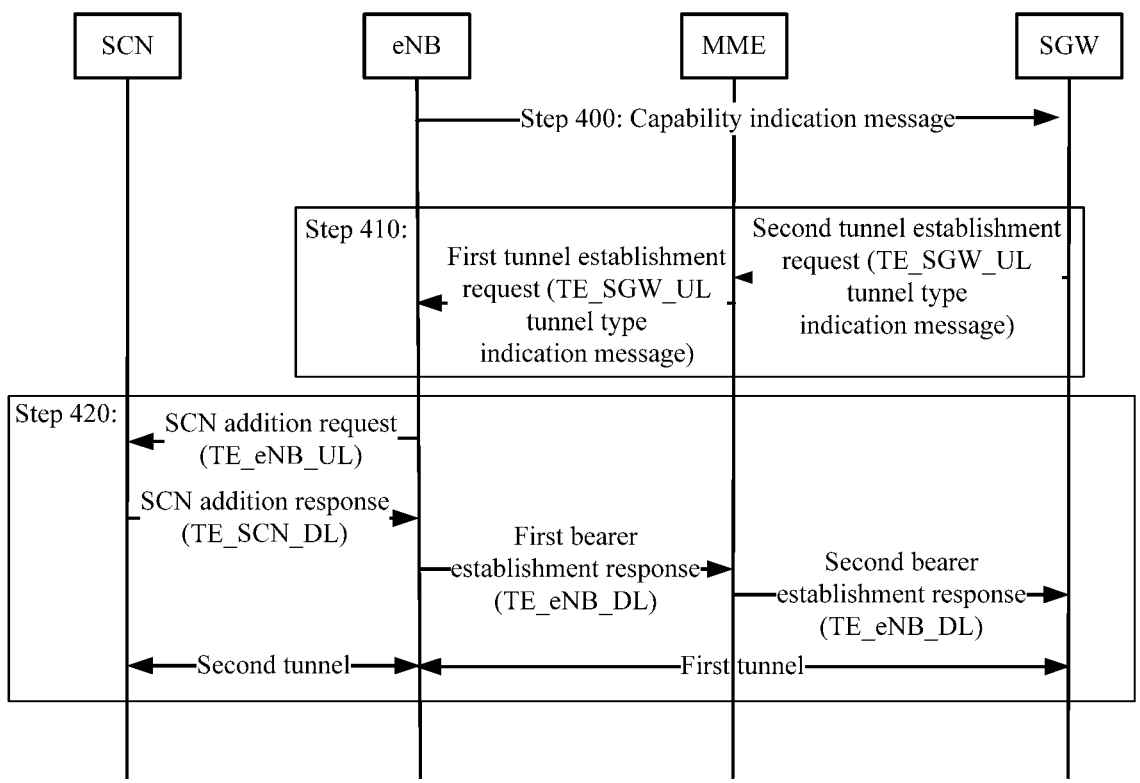
FIG. 4C is an eighth flowchart of tunnel establishment according to an embodiment of the present invention.
Figure 4D:
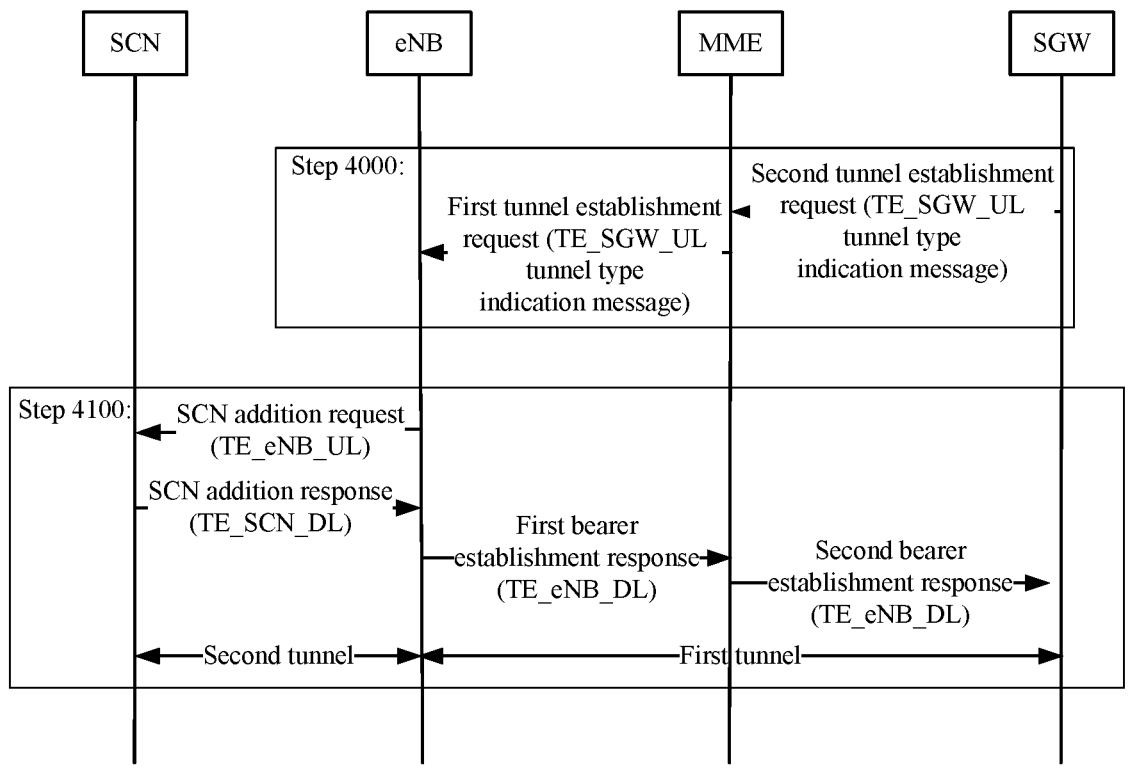
FIG. 4D is a ninth flowchart of tunnel establishment according to an embodiment of the present invention.
Figure 4E:
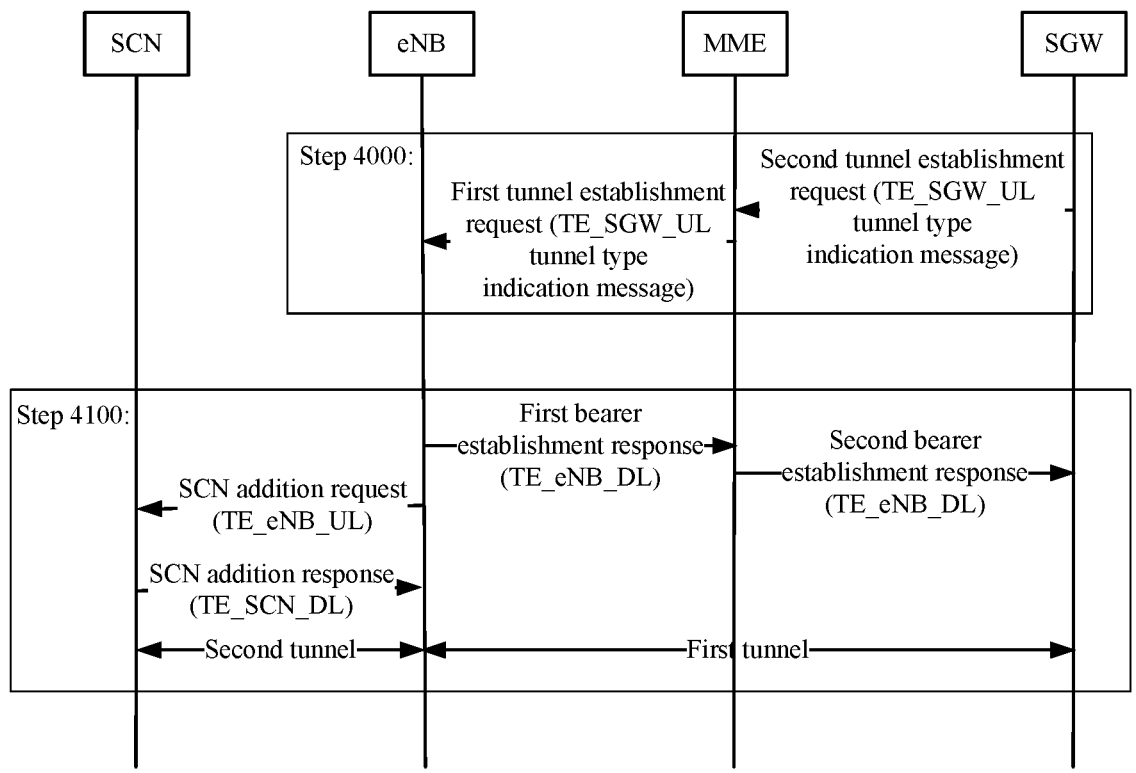
FIG. 4E is a tenth flowchart of tunnel establishment according to an embodiment of the present invention.

The MME is used as an example in both Embodiment 4 and Embodiment 5. Alternatively, in an actual application, it may be that a core network user plane node, such as the SGW, adds the type information of the to-be-established tunnel to a second tunnel establishment request when the core network user plane node sends the second tunnel establishment request, as shown in FIG. 4C (first establishing the second tunnel and then establishing the first tunnel), FIG. 4D (first establishing the second tunnel and then establishing the first tunnel), and FIG. 4E (first establishing the first tunnel and then establishing the second tunnel). A process is similar to Embodiment 4 and Embodiment 5, and details are not described herein again.

During acquiring of the type information of the to-be-established tunnel in an actual application, it may be that network load information is directly acquired, and the type information of the to-be-established tunnel is determined according to the network load information. An example in which the eNB acquires the network load information is used for description in the following.

Figure 5A:
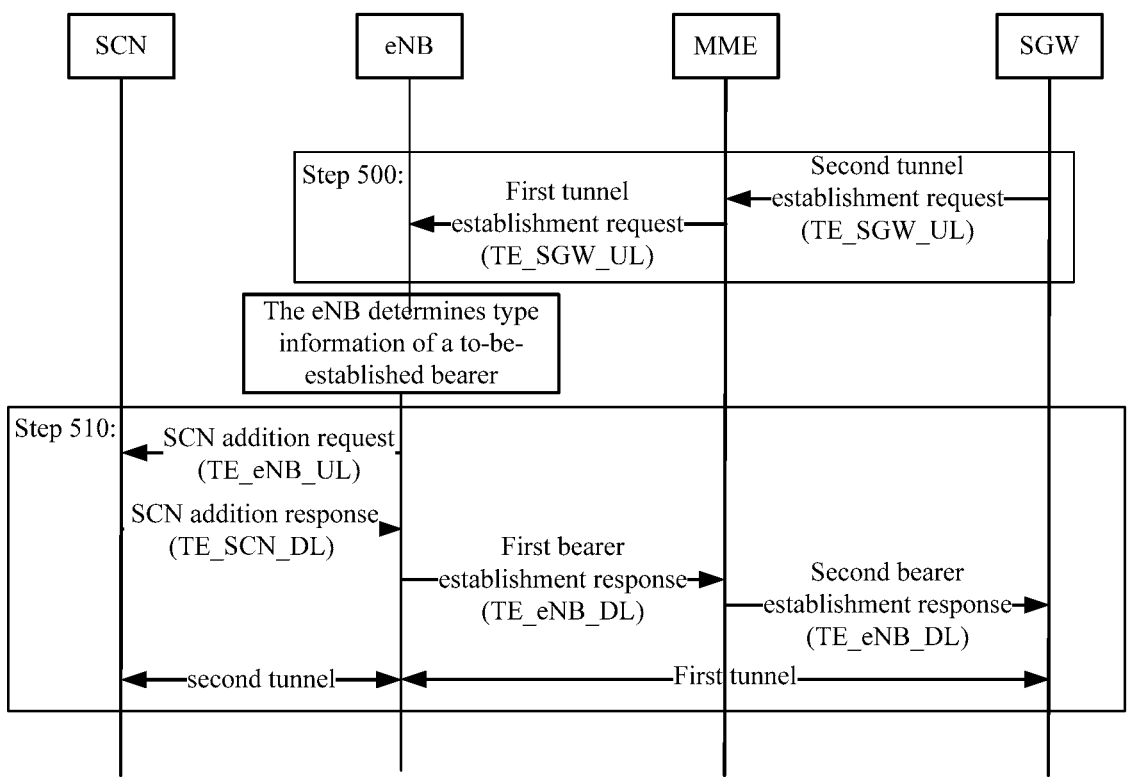
FIG. 5A is an eleventh flowchart of tunnel establishment according to an embodiment of the present invention.

Embodiment 6 (Details are Shown in FIG. 5A)

Step 500: An eNB receives a first tunnel establishment request sent by an MME.

Step 510: The eNB receives a message that is reported by the MME and indicates that path switching signaling load exceeds a second preset threshold.

Alternatively, in this step, it may be that the eNB detects path switching signaling load of the MME in real time.

Step 520: The eNB establishes a first tunnel and a second tunnel according to the message reported by the MME.

Figure 5B:
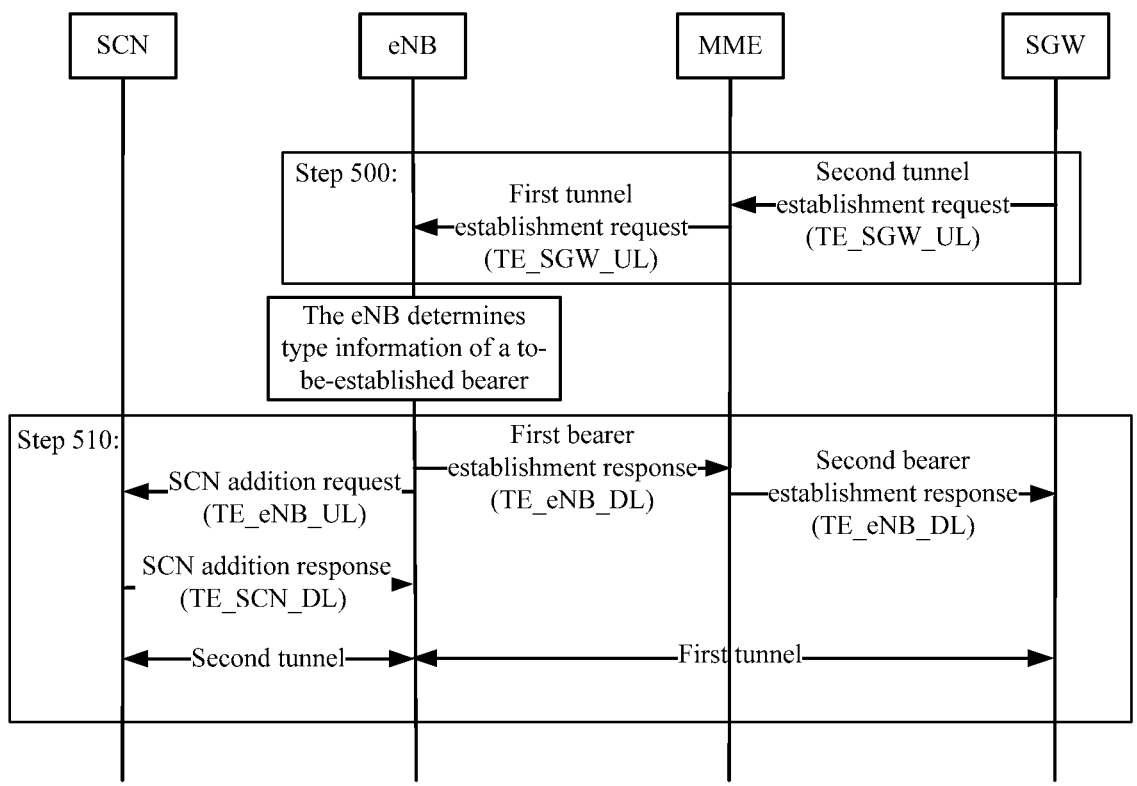
FIG. 5B is a twelfth flowchart of tunnel establishment according to an embodiment of the present invention.

Alternatively, in an actual application, it may be that the first tunnel is established first, and then the second tunnel is established, as shown in FIG. 5B.

Figure 6:
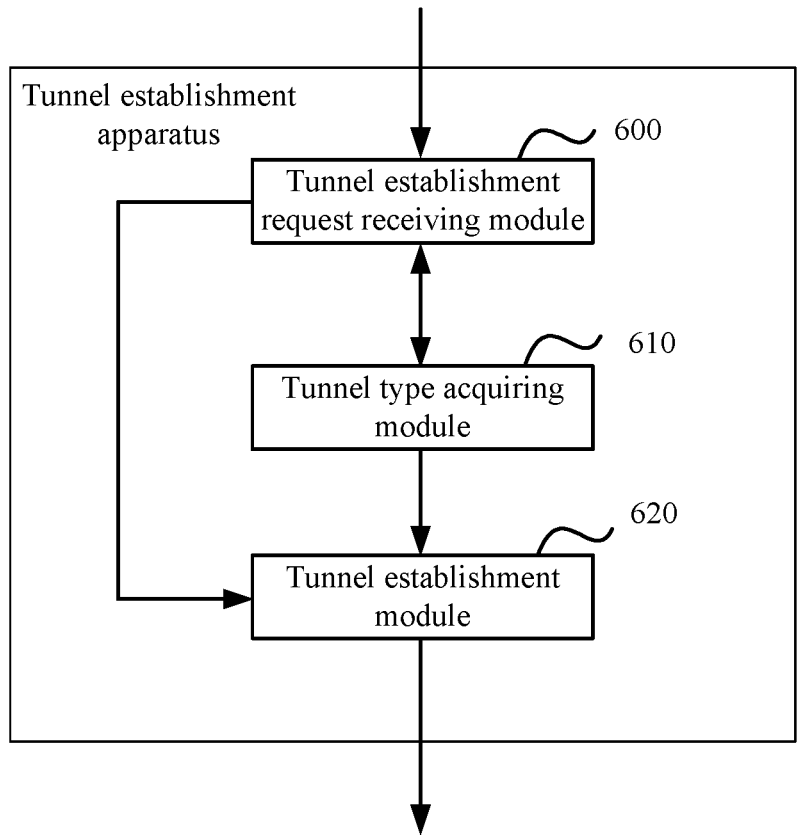
FIG. 6 is a schematic diagram of a tunnel establishment apparatus according to an embodiment of the present invention.

Referring to FIG. 6, an embodiment of the present invention provides a tunnel establishment apparatus. The apparatus mainly includes:

a tunnel establishment request receiving module 600, configured to receive a first tunnel establishment request sent by a core network control plane node, where the first tunnel establishment request is sent after the core network control plane node receives a second tunnel establishment request sent by a core network user plane node;

a tunnel type acquiring module 610, configured to acquire type information of a to-be-established tunnel; and a tunnel establishment module 620, configured to establish a tunnel between the core network user plane node and a secondary access network node according to the first tunnel establishment request and based on the type information of the to-be-established tunnel.

Optionally, in this embodiment of the present invention, the tunnel type acquiring module 610 is specifically configured to:

receive a tunnel type indication message that is sent by an OAM system, or the core network user plane node, or the core network control plane node; and obtain the type information of the to-be-established tunnel by parsing the tunnel type indication message, where the type information of the to-be-established tunnel is separately determined by the OAM, or the core network user plane node, or the core network control plane node according to network load information.

Optionally, in this embodiment of the present invention, the tunnel type acquiring module 610 may further be specifically configured to:

obtain the type information of the to-be-established tunnel by parsing the first tunnel establishment request, where the tunnel type information acquired from the first tunnel establishment request is determined by the core network control plane node or the core network user plane node according to network load information.

Optionally, in this embodiment of the present invention, the tunnel type acquiring module 610 may further be specifically configured to:

if the type information of the to-be-established tunnel is acquired according to the tunnel type indication message, a capability indication message that carries supported tunnel type information is sent to the OAM system, or the core network user plane node, or the core network control plane node before the tunnel type indication message is received; or if the type information of the to-be-established tunnel is acquired according to the first tunnel establishment request, a capability indication message that carries supported tunnel type information is sent to the core network user plane node or the core network control plane node before the first tunnel establishment request is received.

In this embodiment of the present invention, the tunnel type acquiring module 610 may further be specifically configured to:

acquire network load information, and determine the type information of the to-be-established tunnel according to the network load information.

In this embodiment of the present invention, the network load information used for determining the type information of the to-be-established tunnel that is acquired by the tunnel type acquiring module 610 includes various information that includes, data load of an established tunnel between the secondary access network node and a primary access network node, and/or path switching signaling load of the core network control plane node.

In this embodiment of the present invention, optionally, the type information of the to-be-established tunnel that is acquired by the tunnel type acquiring module is to allow termination of a tunnel from the core network user plane node for the secondary access network node, or is to forbid termination of a tunnel from the core network user plane node for the secondary access network node.

Optionally, in this embodiment of the present invention, the tunnel establishment module 620 is specifically configured to:

establish a first tunnel between the core network user plane node and the primary access network node, and establish a second tunnel between the secondary access network node and the primary access network node; or establish a third tunnel between the core network user plane node and the secondary access network node.

In this embodiment of the present invention, during the establishment of the first tunnel, optionally, the tunnel establishment module 620 is specifically configured to:

acquire, from the received first tunnel establishment request, first tunnel information corresponding to a tunnel endpoint allocated by the core network user plane node; and send, to the core network user plane node, second tunnel information corresponding to a tunnel endpoint allocated by the primary access network node.

In this embodiment of the present invention, during the establishment of the second tunnel, optionally, the tunnel establishment module 620 is specifically configured to:

send, to the secondary access network node, third tunnel information corresponding to a tunnel endpoint allocated by the primary access network node; and receive fourth tunnel information corresponding to a tunnel endpoint allocated by the secondary access network node.

In this embodiment of the present invention, during the establishment of the third tunnel, optionally, the tunnel establishment module 620 is specifically configured to:

acquire, from the received first tunnel establishment request, first tunnel information corresponding to a tunnel endpoint allocated by the core network user plane node, and send the first tunnel information to the secondary access network node; and receive fourth tunnel information corresponding to a tunnel endpoint allocated by the secondary access network node, and send the fourth tunnel information to the core network user plane node.

Figure 7:
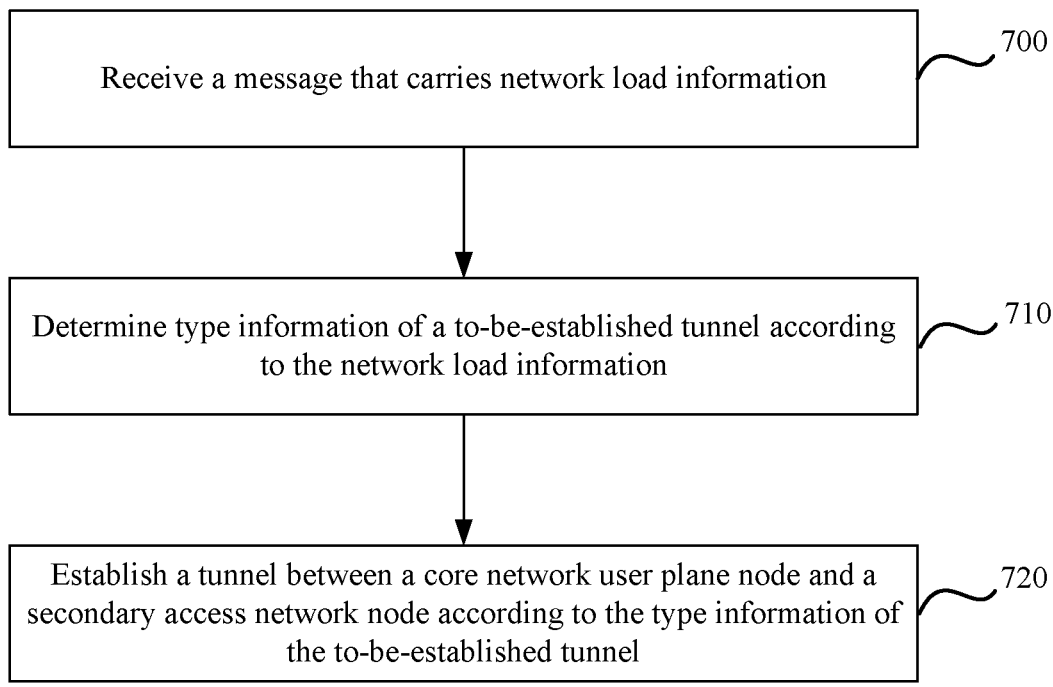
FIG. 7 is another detailed flowchart of tunnel establishment according to an embodiment of the present invention.

Embodiment 7 (Details are Shown in FIG. 7)

Step 700: Receive a message that carries network load information.

Step 710: Determine type information of a to-be-established tunnel according to the network load information.

Step 720: Establish a tunnel between a core network user plane node and a secondary access network node according to the type information of the to-be-established tunnel.

In this embodiment of the present invention, the network load information may take multiple forms that, optionally include one of or any combination of data load of an established tunnel between the secondary access network node and a primary access network node, signaling load of a core network control plane node, and transmission network load at an X2 interface of the secondary access network node, where the data load of the established tunnel between the secondary access network node and the primary access network node and the transmission network load at the X2 interface of the secondary access network node are sent by the secondary access network node, and the signaling load of the core network control plane node is sent by the core network control plane node. Certainly, other information may be included, which is not described herein again.

For example, there are multiple manners of receiving the data load of the established tunnel between the secondary access network node and the primary access network node or the transmission network load at the X2 interface of the secondary access network node. Optionally, after a receiving entity sends a request to the secondary access network node, the secondary access network node reports the load to the receiving entity. Alternatively, it may be that the secondary access network node periodically reports the load to the receiving entity.

For another example, there are also multiple manners of receiving the signaling load of the core network control plane node. Optionally, it may be that after the signaling load of the core network control plane node reaches a third preset threshold, the core network control plane node actively sends the signaling load to a receiving entity, or it may be that a receiving entity periodically checks the signaling load of the core network control plane node and then acquires the signaling load.

In this embodiment of the present invention, there are multiple manners of determining the type information of the to-be-established tunnel according to the network load information. Optionally, the following manner is adopted:

determining type information of a to-be-established bearer according to the network load information; and determining the type information of the to-be-established tunnel according to the type information of the to-be-established bearer.

In this embodiment of the present invention, optionally, the type information of the to-be-established bearer is used to indicate that the to-be-established bearer is simultaneously served by the primary access network node and the secondary access network node, or is served only by the secondary access network node.

In this embodiment of the present invention, the type information of the to-be-established tunnel is used to indicate that the to-be-established tunnel is an indirect tunnel or a direct tunnel.

For example, when the transmission network load at the X2 interface of the secondary access network node is greater than a fourth preset threshold, it is determined that the type information of the to-be-established tunnel is a direct tunnel, or it is determined that the type information of the to-be-established bearer is that the to-be-established bearer is served only by the secondary access network node; when the transmission network load at the X2 interface of the secondary access network node is less than or equal to the fourth preset threshold, it is determined that the type information of the to-be-established tunnel is an indirect tunnel, or it is determined that the type information of the to-be-established bearer is that the to-be-established bearer is simultaneously served by the primary access network node and the secondary access network node.

For another example, when the data load of the established tunnel between the secondary access network node and the primary access network node is greater than a fifth preset threshold, it is determined that the type information of the to-be-established tunnel is a direct tunnel, or it is determined that the type information of the to-be-established bearer is that the to-be-established bearer is served only by the secondary access network node; when the data load of the established tunnel between the secondary access network node and the primary access network node is less than or equal to the fifth preset threshold, it is determined that the type information of the to-be-established tunnel is an indirect tunnel, or it is determined that the type information of the to-be-established bearer is that the to-be-established bearer is simultaneously served by the primary access network node and the secondary access network node.

For another example, when the signaling load of the core network control plane node is greater than a sixth preset threshold, it is determined that the type information of the to-be-established tunnel is an indirect tunnel, or it is determined that the type information of the to-be-established bearer is that the to-be-established bearer is simultaneously served by the primary access network node and the secondary access network node; when the signaling load of the core network control plane node is less than or equal to the sixth preset threshold, it is determined that the type information of the to-be-established tunnel is a direct tunnel, or it is determined that the type information of the to-be-established bearer is that the to-be-established bearer is served only by the secondary access network node.

In the foregoing process, a determining entity determines the type information of the to-be-established tunnel or the type information of the to-be-established bearer only when a tunnel is not established for the first time. When a tunnel is established for the first time, no network load information is generated, and the determining entity may determine the type information of the to-be-established tunnel or the type information of the to-be-established bearer according to an operator's pre-configuration.

When the type information of the to-be-established bearer indicates that the to-be-established bearer is simultaneously served by the primary access network node and the secondary access network node, it is determined that a type of the to-be-established tunnel is an indirect tunnel. When the type information of the to-be-established bearer indicates that the to-be-established bearer is served only by the secondary access network node, it is determined that the type of the to-be-established tunnel is a direct tunnel.

In this embodiment of the present invention, there are multiple manners of establishing the tunnel between the core network user plane node and the secondary access network node according to the type information of the to-be-established tunnel.

For example, when the type information of the to-be-established tunnel indicates that the type of the to-be-established tunnel is an indirect tunnel, a first tunnel is established between the core network user plane node and the primary access network node, and a second tunnel is established between the secondary access network node and the primary access network node, or a second tunnel is established between the secondary access network node and the primary access network node.

For another example, when the type information of the to-be-established tunnel indicates that the type of the to-be-established tunnel is a direct tunnel, a third tunnel is established between the core network user plane node and the secondary access network node.

In this embodiment of the present invention, there are multiple manners of establishing the first tunnel between the core network user plane node and the primary access network node. Optionally, first tunnel information corresponding to a tunnel endpoint allocated by the core network user plane node is acquired, and second tunnel information corresponding to a tunnel endpoint allocated by the primary access network node is sent to the core network user plane node by using the core network control plane node.

If an entity that executes steps 700 to 720 is the primary access network node, the foregoing operations are performed. If the entity that executes step 700 to 720 is not the primary access network node, after the first tunnel information corresponding to the tunnel endpoint allocated by the core network user plane node is acquired, the first tunnel information further needs to be sent to the primary access network node, and before the second tunnel information corresponding to the tunnel endpoint allocated by the primary access network node is sent to the core network user plane node by using the core network control plane node, the second tunnel information needs to be acquired from the primary access network node.

Similarly, in this embodiment of the present invention, there are multiple manners of establishing the second tunnel between the secondary access network node and the primary access network node. Optionally, third tunnel information corresponding to a tunnel endpoint allocated by the primary access network node is sent to the secondary access network node, and fourth tunnel information corresponding to a tunnel endpoint allocated by the secondary access network node is received.

If the entity that executes steps 700 to 720 is the primary access network node, the foregoing operations are performed. If the entity that executes step 700 to 720 is not the primary access network node, before the third tunnel information corresponding to the tunnel endpoint allocated by the primary access network node is sent to the secondary access network node, the third tunnel information needs to be acquired from the primary access network node, and after the fourth tunnel information corresponding to the tunnel endpoint allocated by the secondary access network node is acquired, the fourth tunnel information further needs to be sent to the primary access network node.

Similar to the foregoing manners of establishing the first tunnel or the second tunnel, in this embodiment of the present invention, there are multiple manners of establishing the third tunnel between the core network user plane node and the secondary access network node. Optionally, first tunnel information corresponding to a tunnel endpoint allocated by the core network user plane node is acquired, and the first tunnel information is sent to the secondary access network node; fourth tunnel information corresponding to a tunnel endpoint allocated by the secondary access network node is acquired, and the fourth tunnel information is sent to the core network user plane node by using the core network control plane node.

In this embodiment of the present invention, each piece of tunnel information includes at least IP (Internet Protocol, Internet Protocol) address information and a TEID (Tunnel Endpoint Identifier, tunnel endpoint identifier).

There are multiple types of execution entities in Embodiment 7 of the present invention, which, for example, may be the primary access network node, or may be the secondary access network node, or may further be the core network user plane node or the core network control plane node. When the execution entity is the primary access network node, it may be specifically a base station or an AP (Access Point, access point); when the execution entity is the core network control plane node, it may be specifically an MME, an SGSN, or the like.

Figure 8:
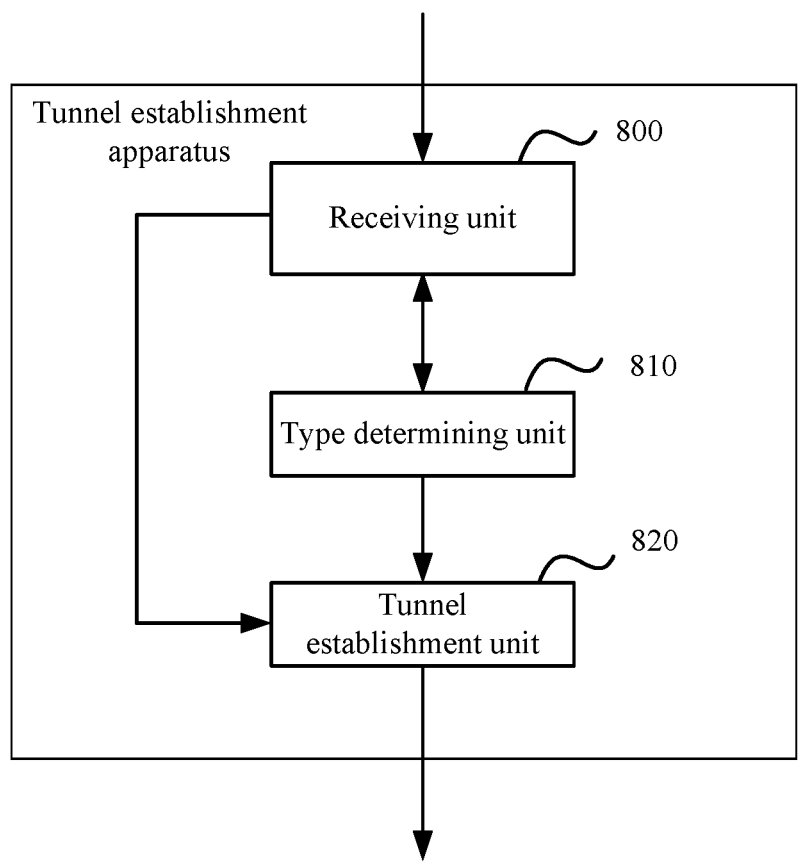
FIG. 8 is another schematic diagram of a tunnel establishment apparatus according to an embodiment of the present invention.

Referring to FIG. 8, an embodiment of the present invention provides a tunnel establishment apparatus. The apparatus mainly includes:

a receiving unit 800, configured to receive a message that carries network load information;

a type determining unit 810, configured to determine type information of a to-be-established tunnel according to the network load information; and a tunnel establishment unit 820, configured to establish a tunnel between a core network user plane node and a secondary access network node according to the type information of the to-be-established tunnel.

Optionally, in this embodiment of the present invention, the receiving unit 800 is specifically configured to:

receive a message that carries data load of an established tunnel between the secondary access network node and a primary access network node; and/or receive a message that carries signaling load of a core network control plane node; and/or receive a message that carries transmission network load at an X2 interface of the secondary access network node, where the transmission network load is sent by the secondary access network node.

Optionally, in this embodiment of the present invention, the type determining unit 810 is specifically configured to:

determine type information of a to-be-established bearer according to the network load information; and determine the type information of the to-be-established tunnel according to the type information of the to-be-established bearer.

Optionally, in this embodiment of the present invention, the type information of the to-be-established bearer that is determined by the type determining unit 810 is used to indicate that the to-be-established bearer is simultaneously served by the primary access network node and the secondary access network node, or is served only by the secondary access network node.

Optionally, in this embodiment of the present invention, the type information of the to-be-established tunnel that is determined by the type unit is used to indicate that the to-be-established tunnel is an indirect tunnel or a direct tunnel.

Optionally, in this embodiment of the present invention, the tunnel establishment unit 820 is specifically configured to:

when the type information of the to-be-established tunnel indicates that the to-be-established tunnel is an indirect tunnel, establish a first tunnel between the core network user plane node and the primary access network node, and establish a second tunnel between the secondary access network node and the primary access network node, or establish a second tunnel between the secondary access network node and the primary access network node; or when the type information of the to-be-established tunnel indicates that the to-be-established tunnel is a direct tunnel, establish a third tunnel between the core network user plane node and the secondary access network node.

Optionally, in this embodiment of the present invention, that the tunnel establishment unit 820 establishes a first tunnel between the core network user plane node and the primary access network node is specifically:

acquiring first tunnel information corresponding to a tunnel endpoint allocated by the core network user plane node; and ending, to the core network user plane node by using the core network control plane node, second tunnel information corresponding to a tunnel endpoint allocated by the primary access network node.

Optionally, in this embodiment of the present invention, that the tunnel establishment unit 820 establishes a second tunnel between the secondary access network node and the primary access network node is specifically:

sending, to the secondary access network node, third tunnel information corresponding to a tunnel endpoint allocated by the primary access network node; and acquiring fourth tunnel information corresponding to a tunnel endpoint allocated by the secondary access network node.

Optionally, in this embodiment of the present invention, that the tunnel establishment unit 820 establishes a third tunnel between the core network user plane node and the secondary access network node is specifically:

acquiring the first tunnel information corresponding to the tunnel endpoint allocated by the core network user plane node, and sending the first tunnel information to the secondary access network node; and acquiring the fourth tunnel information corresponding to the tunnel endpoint allocated by the secondary access network node, and sending the fourth tunnel information to the core network user plane node by using the core network control plane node.

To sum up, a tunnel establishment method is provided in the embodiments of the present invention, including: receiving a first tunnel establishment request sent by a core network control plane node, where the first tunnel establishment request is sent after the core network control plane node receives a second tunnel establishment request sent by a core network user plane node; acquiring type information of a to-be-established tunnel; and establishing a tunnel between the core network user plane node and a secondary access network node according to the first tunnel establishment request and based on the type information of the to-be-established tunnel. In this way, a type of a tunnel that is established for each service of a terminal may be the same or may be different even if an entity for executing steps 200 to 220 is not changed. For example, a first tunnel and a second tunnel may be established for a current service of the terminal, and a third tunnel may be established for a next service of the terminal. This eases congestion in a backbone network between the secondary access network node and a primary access network node, reduces a delay in transmission of user data packets, and reduces losses of user data packets. Alternatively, this avoids using a directly connected tunnel as a tunnel established between the secondary access network node and the core network user plane node when the core network control plane node needs to receive and send too much path switching signaling, thereby preventing a core network breakdown because the core network control plane node needs to receive and send too much path switching signaling.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

Although the foregoing embodiments of the present invention have been described, persons skilled in the art can make changes and modifications to these embodiments once they learn the basic inventive concept. Therefore, the following claims are intended to be construed as to cover the foregoing embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method performed by a primary access network node in a wireless network for establishing a tunnel between a core network user plane node and a secondary access network node, wherein each of the core network user plane node and the secondary access network node is connected to the primary access network node, the method comprising:
   receiving, by the primary access network node, a first tunnel establishment request from a core network control plane node,
      wherein the first tunnel establishment request is received by the primary access network node in response to the core network control plane node receiving a second tunnel establishment request from the core network user plane node;
   acquiring, by the primary access network node, network load information comprising at least one of (a) a data load of a previously established tunnel between the primary and secondary access network nodes and (b) a path switching signaling load of the core network control plane node;
   determining, by the primary access network node, a type of the tunnel to be established between the core network user plane node and the secondary access network node according to the network load information; and
   establishing, by the primary access network node, the tunnel between the core network user plane node and the secondary access network node according to the first tunnel establishment request and the determined type of the tunnel, wherein establishing the tunnel between the core network user plane node and the secondary access network node comprises:
      establishing, by the primary access network node, a first tunnel between the core network user plane node and the primary access network node and a second tunnel between the primary access network node and the secondary access network node, or
      establishing, by the primary access network node, a third tunnel between the core network user plane node and the secondary access network node.

2. The method according to claim 1, wherein establishing the first tunnel between the core network user plane node and the primary access network node comprises:
   acquiring, from the received first tunnel establishment request, internet protocol (IP) address information and tunnel endpoint identifier (TEID) of the core network user plane node; and
   sending, to the core network user plane node, IP address information and TEID of the primary access network node.

3. The method according to claim 1, wherein establishing the second tunnel between the primary access network node and the secondary access network node comprises:
   sending, to the secondary access network node, internet protocol (IP) address information and tunnel endpoint identifier (TEID) of the primary access network node; and
   receiving, from the secondary access network node, IP address information and TEID of the secondary access network node.

4. The method according to claim 1, wherein establishing the third tunnel between the core network user plane node and the secondary access network node comprises:

acquiring, from the received first tunnel establishment request, internet protocol (IP) address information and tunnel endpoint identifier (TEID) of the core network user plane node; sending, to the secondary access network node, the IP address information and the TEID of the core network user plane node;

receiving, from the secondary access network node, IP address information and TEID of the secondary access network node; and sending, to the core network user plane node, the IP address information and the TEID of the secondary access network node.

5. A primary access network node that supports establishing a tunnel between a core network user plane node and a secondary access network node, wherein each of the core network user plane node and the secondary access network node is connected to the primary access network node, the primary access network node comprising:
  a non-transitory memory storing instructions; and
  a processor coupled to the memory to execute the instructions to:
    receive a first tunnel establishment request from a core network control plane node, wherein the first tunnel establishment request from the core network control plane node is received in response to the core network control plane node receiving a second tunnel establishment request from the core network user plane node;
    acquire network load information comprising at least one of (a) a data load of a previously established tunnel between the primary and secondary access network nodes and (b) a path switching signaling load of the core network control plane node;
    determine a type of the tunnel to be established between the core network user plane node and the secondary access network node according to the network load information; and
    establish the tunnel between the core network user plane node and the secondary access network node according to the first tunnel establishment request and the determined type of the tunnel, wherein establishing the tunnel between the core network user plane node and the secondary access network node comprises:
      establish a first tunnel between the core network user plane node and the primary access network node and a second tunnel between the primary access network node and the secondary access network node, or
      establish a third tunnel between the core network user plane node and the secondary access network node.

6. The primary access network node according to claim 5, wherein the processor further executes instructions to:
  acquire, from the received first tunnel establishment request, internet protocol (IP) address information and tunnel endpoint identifier (TEID) of the core network user plane node; and
  send, to the core network user plane node, IP address information and TEID of the primary access network node.

7. The primary access network node according to claim 5, wherein the processor further executes instructions to:
  send, to the secondary access network node, internet protocol (IP) address information and tunnel endpoint identifier (TEID) of the primary access network node; and
  receive, from the secondary access network node, IP address information and TEID of the secondary access network node.

8. The primary access network node according to claim 5, wherein the processor further executes instructions to:
  acquire, from the received first tunnel establishment request, internet protocol (IP) address information and tunnel endpoint identifier (TEID) of the core network user plane node; send, to the secondary access network node, the IP address information and the TEID of the core network user plane node;
  receive, from the secondary access network node, IP address information and TEID of the secondary access network node; and send, to the core network user plane node, the IP address information and the TEID of the secondary access network node.

9. A non-transitory computer-readable storage medium comprising instructions which, when executed by a computer, cause the computer to:
  receive a first tunnel establishment request from a core network control plane node,
    wherein the first tunnel establishment request is received from the core network control plane node in response to the core network control plane node receiving a second tunnel establishment request from a core network user plane node;
  acquire network load information comprising at least one of (a) a data load of a previously established tunnel between primary and secondary access network nodes and (b) a path switching signaling load of the core network control plane node;
  determine a type of a tunnel to be established between the core network user plane node and the secondary access network node according to the network load information; and
  establish the tunnel between the core network user plane node and the secondary access network node according to the first tunnel establishment request and the determined type of the tunnel, wherein establishing the tunnel between the core network user plane node and the secondary access network node comprises:
    establish a first tunnel between the core network user plane node and the primary access network node and a second tunnel between the primary access network node and the secondary access network node, or
    establish a third tunnel between the core network user plane node and the secondary access network node.

10. The non-transitory computer-readable storage medium according to claim 9, wherein the instructions further cause the computer to:
  acquire, from the received first tunnel establishment request, internet protocol (IP) address information and tunnel endpoint identifier (TEID) of the core network user plane node; and
  send, to the core network user plane node, IP address information and TEID of the primary access network node.

11. The non-transitory computer-readable storage medium according to claim 9, wherein the instructions further cause the computer to:
  send, to the secondary access network node, internet protocol (IP) address information and tunnel endpoint identifier (TEID) of the primary access network node; and
  receive, from the secondary access network node, IP address information and TEID of the secondary access network node.

12. The non-transitory computer-readable storage medium according to claim 9, wherein the instructions further cause the computer to:
- acquire, from the received first tunnel establishment request, internet protocol (IP) address information and tunnel endpoint identifier (TEID) of the core network user plane node;
- send, to the secondary access network node, the IP address information and the TEID of the core network user plane node;
- receive, from the secondary access network node, IP address information and TEID of the secondary access network node; and send, to the core network user plane node, the IP address information and the TEID of the secondary access network node.

* * * * *